US009917915B2

(12) United States Patent
Kanaya

(10) Patent No.: US 9,917,915 B2
(45) Date of Patent: Mar. 13, 2018

(54) INFORMATION PROCESSING SYSTEM, INFORMATION PROCESSING APPARATUS, TERMINAL APPARATUS AND INFORMATION TRANSMISSION METHOD FOR ORDERED TRANSMISSION OF STORED INFORMATION TO BE SYNCHRONOUSLY DISPLAYED AT TERMINAL APPARATUSES

(71) Applicant: Mitsuhisa Kanaya, Tokyo (JP)

(72) Inventor: Mitsuhisa Kanaya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 611 days.

(21) Appl. No.: 14/462,645

(22) Filed: Aug. 19, 2014

(65) Prior Publication Data

US 2015/0058397 A1 Feb. 26, 2015

(30) Foreign Application Priority Data

Aug. 21, 2013 (JP) ................. 2013-171240
Jul. 14, 2014 (JP) ................. 2014-143942

(51) Int. Cl.
*G06F 15/16* (2006.01)
*H04L 29/08* (2006.01)
*H04L 29/06* (2006.01)

(52) U.S. Cl.
CPC ........ *H04L 67/2823* (2013.01); *H04L 65/403* (2013.01); *H04L 65/602* (2013.01);
(Continued)

(58) Field of Classification Search
CPC ......... H04N 21/4398; H04N 21/23406; H04N 21/25891
(Continued)

(56) References Cited

U.S. PATENT DOCUMENTS 5,996,003 A 11/1999 Namikata et al.
6,573,926 B1 6/2003 Ichimura
(Continued)

FOREIGN PATENT DOCUMENTS

JP H07-327219 12/1995
JP H09-101767 4/1997
(Continued)

OTHER PUBLICATIONS

Extended European Search Report dated Dec. 18, 2014.

*Primary Examiner* — Liangche A Wang
(74) *Attorney, Agent, or Firm* — Harness, Dickey & Pierce, PLC

(57) ABSTRACT

An information processing system includes one or more terminal apparatuses and an information processing apparatus connected via a network. The system converts stored information, based on a method determined for each of the terminal apparatuses, into at least first transmission information and second transmission information to be transmitted to the terminal apparatuses; transmits the first transmission information including a first display part of the information to one of the terminal apparatuses and transmits the second transmission information including a second display part of the information different from the first display part to the one of the terminal apparatuses after transmitting the first transmission information; and displays ones of the at least first transmission information and second transmission information.

9 Claims, 19 Drawing Sheets

(52) U.S. Cl.
CPC .......... *H04L 65/80* (2013.01); *H04L 65/4038* (2013.01); *H04L 67/10* (2013.01)

(58) Field of Classification Search
USPC .................. 709/202, 204, 205, 217, 218
See application file for complete search history.

(56) References Cited

U.S. PATENT DOCUMENTS

| | | |
|---|---|---|
| 6,801,329 B1 | 10/2004 | Urabe et al. |
| 2004/0165214 A1 | 8/2004 | Kanaya |
| 2005/0052678 A1 | 3/2005 | Urabe et al. |
| 2006/0066717 A1 | 3/2006 | Miceli |
| 2008/0005233 A1 | 1/2008 | Cai et al. |
| 2010/0229086 A1* | 9/2010 | Howell ............... G06F 17/2205 715/273 |
| 2012/0089901 A1* | 4/2012 | Collins ............. H04N 1/00244 715/234 |
| 2012/0151336 A1* | 6/2012 | Scherpa .............. H04L 12/1822 715/273 |
| 2013/0007816 A1 | 1/2013 | Krikorian et al. |

FOREIGN PATENT DOCUMENTS

| | | |
|---|---|---|
| JP | H11-239133 | 8/1999 |
| JP | 2000-023133 | 1/2000 |
| JP | 2000-092048 | 3/2000 |
| JP | 2002-132837 | 5/2002 |
| JP | 2004-112617 | 4/2004 |
| JP | 2004-173180 | 6/2004 |
| JP | 2004-187126 | 7/2004 |
| JP | 2005-284344 | 10/2005 |
| JP | 2005-284346 | 10/2005 |
| JP | 3788843 | 6/2006 |
| JP | 2009-111639 | 5/2009 |
| JP | 4931767 | 5/2012 |
| JP | 2012-235385 | 11/2012 |
| JP | 5127400 | 1/2013 |

* cited by examiner

FIG.6

CLIENT INFORMATION

| CLIENT ID | DIVIDING UNIT | DATA FORMAT | SIZE | CACHE INFORMATION |
|---|---|---|---|---|
| 1 | PAGE BY PAGE | JPEG FORMAT | 1024 × 768 PIXELS | 2 PAGES CACHEABLE ALGORITHM A |
| ... | ... | ... | ... | ... |

FIG.20

CLIENT INFORMATION

| CLIENT ID | DIVIDING UNIT | DATA FORMAT | SIZE | CACHE INFORMATION | WHO CONTROLS PAGE CACHE |
|---|---|---|---|---|---|
| 1 | PAGE BY PAGE | JPEG FORMAT | 1024 × 768 PIXELS | 2 PAGES CACHEABLE ALGORITHM A | TERMINAL SIDE |
| 2 | PAGE BY PAGE | JPEG FORMAT | 1024 × 768 PIXELS | 5 PAGES CACHEABLE | SERVER SIDE |
| ... | ... | ... | ... | ... | ... |

INFORMATION PROCESSING SYSTEM, INFORMATION PROCESSING APPARATUS, TERMINAL APPARATUS AND INFORMATION TRANSMISSION METHOD FOR ORDERED TRANSMISSION OF STORED INFORMATION TO BE SYNCHRONOUSLY DISPLAYED AT TERMINAL APPARATUSES

BACKGROUND OF THE INVENTION

1. Field of the Invention

The present invention relates to an information processing system, an information processing apparatus, a terminal apparatus and an information transmission method.

2. Description of the Related Art

A conference system is known (for example, see Japanese Laid-Open Patent Application No. 2000-23133 (Patent Reference No. 1)) where material data such as a document to be used for a conference is transmitted via a communication line, other than a communication line for transmitting real-time data such as a moving-picture data or the like, for transmitting the material data efficiently without adversely affecting transmission of the real-time data or the like.

SUMMARY OF THE INVENTION

According to one aspect of the present invention, an information processing system includes one or more terminal apparatuses and an information processing apparatus which are connected via a network. The information processing system includes an information storage part that stores information; a conversion part that converts the information, based on an information transmission method determined for each of the one or more terminal apparatuses, into at least first transmission information and second transmission information to be transmitted to the one or more terminal apparatuses; a transmission part that transmits the first transmission information including a first display part of the information to one of the one or more terminal apparatuses and transmits the second transmission information including a second display part of the information different from the first display part to the one of the one or more terminal apparatuses after transmitting the first transmission information; and one or more display process parts that display ones of the at least first transmission information and second transmission information.

Other objects, features and advantages of the present invention will become more apparent from the following detailed description when read in conjunction with the accompanying drawings.

BRIEF DESCRIPTION OF THE DRAWINGS

FIG. 6 is a configuration diagram of one example of client information;

FIG. 20 is a configuration diagram of one example of client information according to a third embodiment.

DETAILED DESCRIPTION OF THE EMBODIMENTS

An object of the embodiments is to provide an information processing system, an information processing apparatus, a terminal apparatus and an information transmission method by which transmission of information is controlled depending on terminal apparatuses.

The embodiments of the present invention will be described in detail. Note that according to the embodiments, conference systems will be described as examples of information processing systems. The conference systems according to the embodiments are examples of information processing systems in each of which a conference is started in response to the completion of transmission of conference material to terminal apparatuses from a conference server apparatus. Conference material is one example of information to be transmitted.

First Embodiment

<System Configuration>

Figure 1:
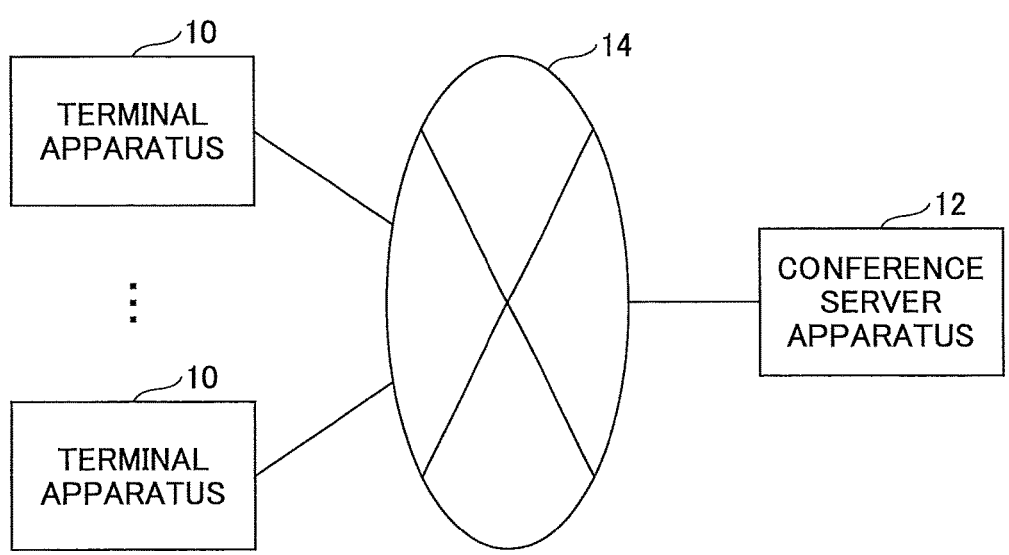
FIG. 1 is a configuration diagram of one example of a conference system according to the first embodiment.

FIG. 1 is a configuration diagram of one example of a conference system according to the first embodiment. The conference system 1 of FIG. 1 includes one or more terminal apparatuses 10 and a conference server apparatus 12 connected to a network 14 in a wired or wireless manner.

Note that the conference server apparatus 12 can be software or a service(s) that operates in a single computer. Further, the conference server apparatus 12 can be software or a service(s) that operates in one or more computers. For example, the conference server apparatus 12 can have a configuration of a so-called "cloud service(s)".

Each terminal apparatus 10 is a device operated by a participant of a conference. the terminal apparatus 10 can be a Personal Computer (PC), a tablet terminal, a portable information terminal such as a smartphone, a cellular phone or a PDA, a display apparatus such as an electronic whiteboard, a projection apparatus such as a projector, or a terminal dedicated to a conference. A conference application is installed in the terminal apparatus 10 for receiving (downloading) conference material from the conference server apparatus 12, carrying out a synchronous display of the conference material, and so forth.

The conference server apparatus 12 is an apparatus carrying out information processing concerning a conference. The conference server apparatus 12 transmits conference material to each terminal apparatus 10. Note that the conference server apparatus 12 can be a Work Station (WS), a PC or so. Communication can be carried out between the conference server apparatus 12 and each terminal apparatus 10, for example, through a communication protocol such as a TCP/IP. The conference server apparatus 12 stores registered conference information, user information and so forth. The conference server apparatus 12 stores conference material registered (uploaded) from the terminal apparatuses 10, or so.

<Hardware Configuration>

Figure 2:
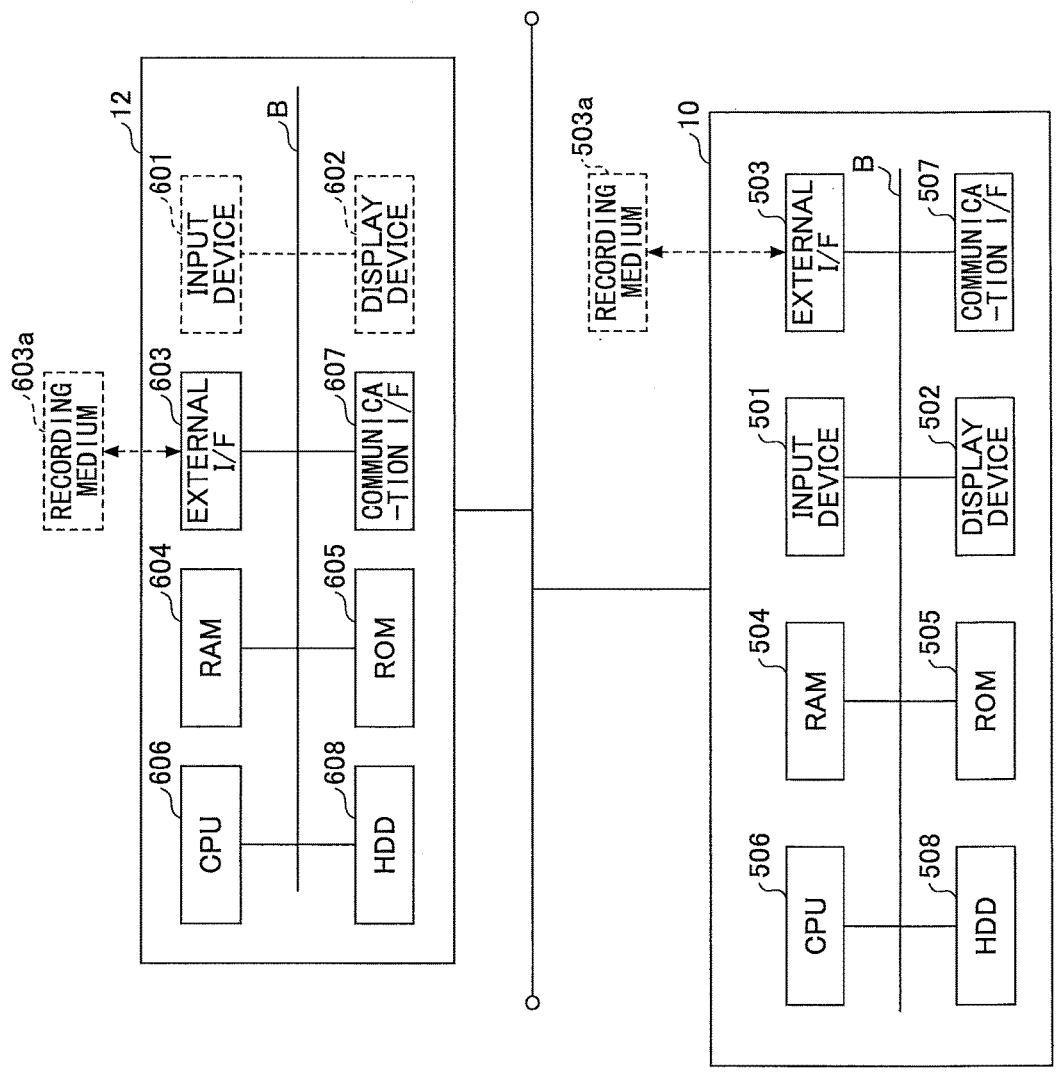
FIG. 2 is a hardware configuration diagram of one example of computers implementing the conference system according to the first embodiment.

Each terminal apparatus 10 and the conference server apparatus 12 have, for example, hardware configurations such as those shown in FIG. 2.

FIG. 2 is a hardware configuration diagram of one example of computers implementing the conference system according to the first embodiment. The terminal apparatus 10 shown in FIG. 2 includes an input device 501, a display device 502, an external I/F 503, a RAM 504, a ROM 505, a CPU 506, a communication I/F 507, a HDD 508 and so forth. The respective parts/devices are connected via a bus B. Note that the terminal apparatus 10 can have a configuration having a camera, a microphone, a speaker and/or the like.

The input device 501 includes a keyboard, a mouse, a touch panel and/or the like, and is used for inputting various operation signals into the terminal apparatus 10. The display device 502 displays a process result of the terminal apparatus 10. The communication I/F 507 is an interface connecting the terminal apparatus 10 with the network 14. Thus, the terminal apparatus 10 can carry out data communication with the conference server apparatus 12 via the communication I/F 507.

The HDD 508 is a nonvolatile storage device storing programs and/or data. The stored programs and/or data include an OS as basic software for controlling the entirety of the terminal apparatus 10, application software providing various functions under the control of the OS and so forth. Further, the HDD 508 manages the stored programs and/or data using a predetermined file system and/or DB.

The external I/F 503 is an interface for an external device. The external device can be a recording medium 503a or the like. Thus, the terminal apparatus 10 can carry out reading information from and writing information into the recording medium 503a via the external I/F 503. The recording medium 503a can be a flexible disk, a CD, a DVD, a SD memory card, a USB memory or the like.

The ROM 505 is a nonvolatile semiconductor memory (storage device) that can hold a program and/or data even after the power supply is turned off. In the ROM 505, a program and/or data such as BIOS to be executed when the terminal apparatus 10 is started, OS settings, network settings and/or the like are stored. The RAM 504 is a volatile semiconductor memory temporarily storing a program and/or data The CPU 506 is a processor that reads a program and/or data from a storage device such as the ROM 505 or the HDD 508 into the RAM 504, carries out processes and thus, controls the entirety of the terminal apparatus 10 and implements functions.

Each terminal apparatus 10 can implement various processes as will be described later as a result of, for example, executing a program with the above-mentioned hardware configuration.

The conference server apparatus 12 shown in FIG. 2 includes an input device 601, a display device 602, an external I/F 603, a RAM 604, a ROM 605, a CPU 606, a communication I/F 607, a HDD 608 and so forth. The respective parts/devices are connected via a bus B. Note that such a style can be employed that the input device 601 and the display device 602 are connected and used, if necessary.

The input device 601 includes a keyboard, a mouse, a touch panel and/or the like, and is used for inputting various operation signals into the conference server apparatus 12. The display device 602 displays a process result of the conference server apparatus 12.

The communication I/F 607 is an interface connecting the conference server apparatus 12 with the network 14. Thus, the conference server apparatus 12 can carry out data communication with the terminal apparatuses 10 via the communication I/F 607.

The HDD 608 is a nonvolatile storage device storing programs and/or data. The stored programs and/or data include an OS as basic software for controlling the entirety of the conference server apparatus 12, application software providing various functions under the control of the OS. Further, the HDD 508 manages the stored programs and/or data using predetermined file system and/or DB.

The external I/F 603 is an interface for an external device. The external device can be a recording medium 603a or the like. Thus, the conference server apparatus 12 can carry out reading information from and writing information into the recording medium 603a via the external I/F 603. The recording medium 603a can be a flexible disk, a CD, a DVD, a SD memory card, a USB memory or the like.

The ROM 605 is a nonvolatile semiconductor memory (storage device) that can hold a program and/or data even after the power supply is turned off. In the ROM 605, a program and/or data such as BIOS to be executed when the conference server apparatus 12 is started, OS settings, network settings and/or the like are stored. The RAM 604 is a volatile semiconductor memory temporarily storing a program and/or data.

The CPU 606 is a processor that reads a program and/or data from a storage device such as the ROM 605 or the HDD 608 into the RAM 604, carries out processes and thus, controls the entirety of the conference server apparatus 12 and implements functions.

The conference server apparatus 12 can implement various processes as will be described later as a result of, for example, executing a program with the above-mentioned hardware configuration.

<Software Configuration>

Figure 3:
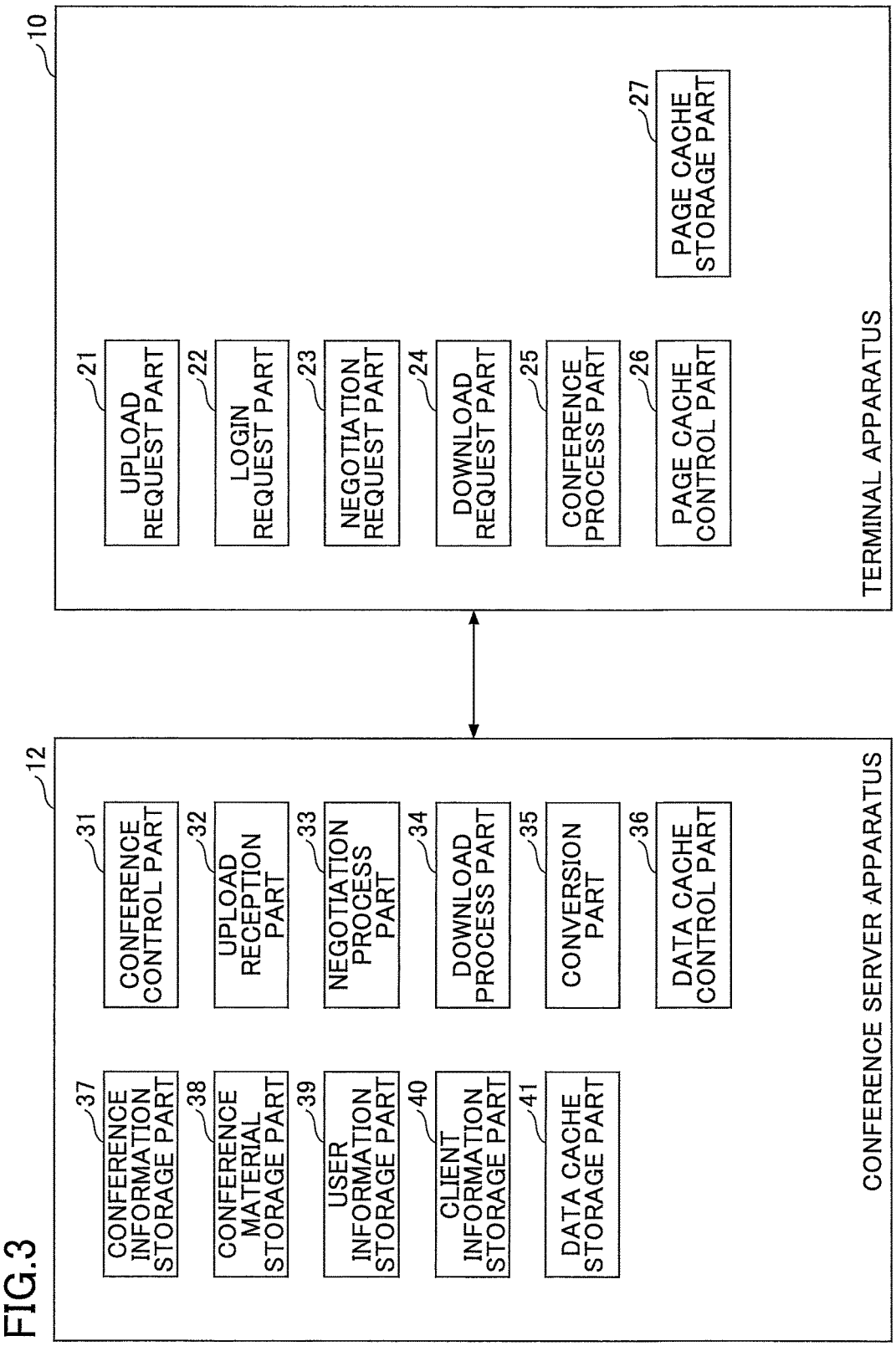
FIG. 3 is a functional block diagram of one example of the conference system according to the first embodiment.

The conference system 1 according to the first embodiment is implemented by, for example, a functional block shown in FIG. 3. FIG. 3 is a functional block diagram of one example of the conference system according to the first embodiment.

The terminal apparatus 10 implements, by executing a program of a conference application or the like, an upload request part 21, a login request part 22, a negotiation request part 23, a download request part 24, a conference process part 25, a page cache control part 26 and a page cache storage part 27.

The conference server apparatus 12 implements, by executing a program, a conference control part 31, an upload reception part 32, a negotiation process part 33, a download process part 34, a conversion part 35, a data cache control part 36, a conference information storage part 37, a conference material storage part 38, a user information storage part 39, a client information storage part 40 and a data cache storage part 41.

Note that it is possible that another server apparatus, or so, capable of carrying out data transmission and reception to and from the conference server apparatus 12, has the conference information storage part 37, the conference material storage part 38, the user information storage part 39, the client information storage part 40 and the data cache storage part 41.

The upload request part 21 is operated by a participant of a conference, and requests the conference server apparatus 12 to upload conference material to the conference server apparatus 12. The login request part 22 is operated by a participant of a conference, and requests the conference server apparatus 12 to login thereto.

The negotiation request part 23 carries out negotiation with the conference server apparatus 12 mutually for information concerning a download method of downloading conference material. Note that according to the first embodiment, "negotiation" means a communication for determining a download method of downloading conference material. The download request part 24 requests the conference server apparatus 12 to download the download data acquired through conversion from conference material based on information ("client information" described later) acquired from negotiation to the terminal apparatus 10.

The conference process part 25 displays download data received from the conference server apparatus 12 on the display device 502 or so, and carries out a "synchronous display" of conference material between the terminal apparatus 10 and another terminal apparatus 10. For example, when a presenter who is one of the participants of a conference operates the own terminal apparatus 10 (the terminal apparatus 10 operated by the presenter) to carry out "paging" on conference material or so, this terminal apparatus 10 transmits information concerning this presenter's operation to the conference server apparatus 12.

Each of the terminal apparatuses 10 of the participants of the conference (the terminal apparatus 10 operated by each participant) other than the presenter receives the information concerning the presenter's operation (the information concerning the presenter's operation transmitted by the presenter's terminal apparatus 10 to the conference server apparatus 12) from the conference server apparatus 12. When the received information indicates "paging", for example, the terminal apparatus 10 of each participant implements a "synchronous display" by receiving download data for carrying out a "synchronous display" from the conference server apparatus 12.

The page cache control part 26 determines download data to be stored in the page cache storage part 27 after a start of a conference, and causes the download request part 24 to download "download data" from the conference server apparatus 12 if necessary. The page cache storage part 27 stores download data.

The conference control part 31 transmits information concerning operation received from the presenter's terminal apparatus 10 to the terminal apparatuses 10 of the respective participants. The conference control part 31 receives a login request from the terminal apparatus 10 and carries out a login process. Conference information and user information described later are used for the login process.

When receiving a request to upload conference material from the terminal apparatus 10, the upload reception part 32 stores the thus uploaded conference material in the conference material storage part 38. The negotiation process part 33 carries out negotiation with the terminal apparatus 10. The negotiation process part 33 stores information concerning a download method of downloading conference material acquired from negotiation in the client information storage part 40 as client information.

The download process part 34 transmits download data, downloading of which is requested by the terminal apparatus 10, to the terminal apparatus 10. The conversion part 35 converts conference material into download data based on client information. The data cache control part 36 determines download data to be stored in the data cache storage part 41. The data cache control part 36 requests the conversion part 35 to convert conference material into download data and stores download data thus determined to be stored in the data cache storage part 41.

Note that it is also possible that a conversion server apparatus connected with the conference server apparatus 12 via the network 14 has the function of the conversion part 35. In such a case, the conference server apparatus 12 requests the conversion server apparatus to carry out conversion and receives download data acquired by the conversion server apparatus through conversion. Further, it is also possible that the conversion server apparatus can be one shared with another server apparatus which is used for another Web service.

The conference information storage part 37 stores "conference information". "Conference information" is information concerning a registered conference and includes a conference name, date and time thereof, uploaded conference material, a conference state, and so forth. The conference material storage part 38 stores data (a file) of conference material. The user information storage part 39 stores accounts of a conference's participants who login, passwords thereof, and so forth.

The client information storage part 40 stores, as "client information", information concerning a download method of downloading conference material acquired by the negotiation process part 33 through negotiation. The client information storage part 40 also stores "page information" of conference material indicating a page of the conference material currently displayed by each terminal apparatus 10. The data cache storage part 41 stores download data which is determined by the data cache control part 36 to store.

<Details of Process>

Below, details of a process in the conference system 1 according to the first embodiment will be described.

Figure 4:
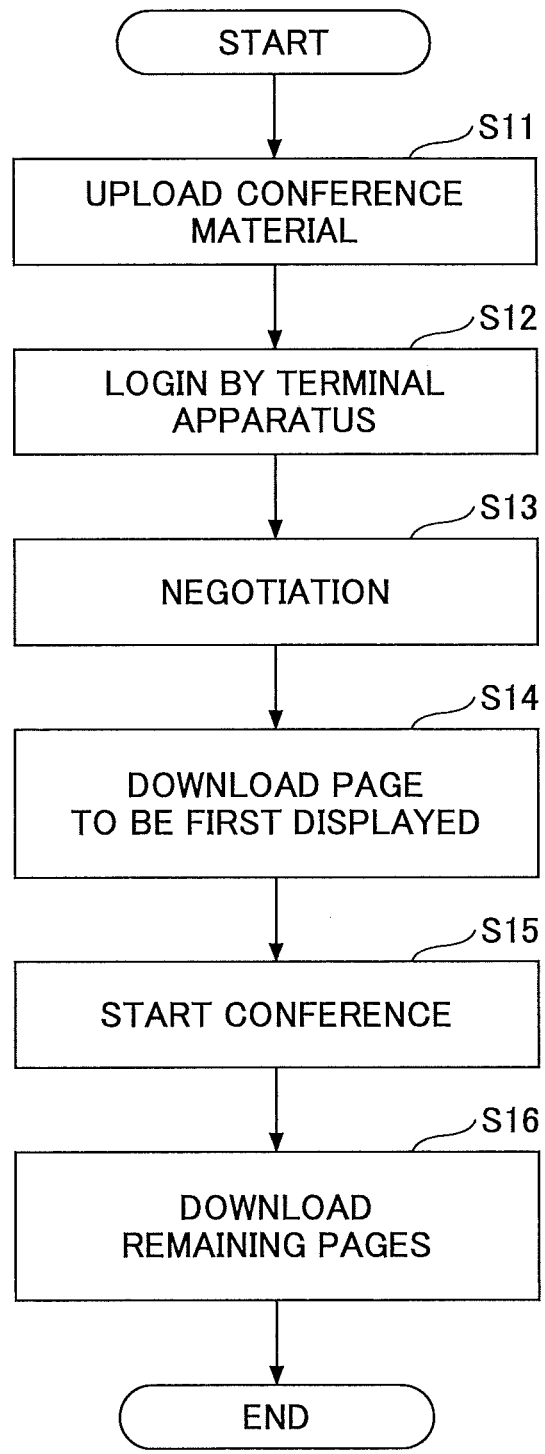
FIG. 4 is a flowchart of a process of one example from uploading conference material to downloading the same.

FIG. 4 is a flowchart of a process of one example from uploading conference material to downloading the same. In step S11, a presenter, a host or the like of a conference, uploads conference material before actually conducting the conference. That is, the upload request part 21 of his or her terminal apparatus 10 responds to an operation carried out by the presenter, host or the like of the conference on the terminal apparatus 10 and requests the upload reception part 32 of the conference server apparatus 12 to upload the conference material from the terminal apparatus 10. The upload reception part 32 receives the upload request from the upload request part 21 of the terminal apparatus 10 to upload the conference material and stores the conference material thus uploaded in the conference material storage part 38.

In step S12, the respective participants who participate in the conference login to the conference server apparatus 12 by using respective accounts, passwords and/or the like from their respective terminal apparatuses 10. That is, the login request part 22 of each terminal apparatus 10 requests the conference control part 31 of the conference server apparatus 12 to login, for example, by using the corresponding account, password and/or the like that are/is input by the corresponding participant, for example. The conference control part 31 receives the login request from the login request part 22 of each terminal apparatus 10 and carries out a login process.

When the login is successful, the negotiation request part 23 of the terminal apparatus 10 carries out negotiation with the negotiation process part 33 of the conference server apparatus 12 in step S13. Note that one example of information concerning a download method of downloading conference material is "page by page", "a JPEG format", "1024×768 pixels" and so forth.

After the finish of negotiation, the terminal apparatus 10 receives download data of a page to be first displayed from the conference server apparatus 12 in step S14. Note that the download data received by the terminal apparatus 10 from the conference server apparatus 12 is one acquired from conversion of the conference material based on the information concerning the download method acquired through the negotiation. For example, the download data of the page to be displayed first is, normally, data for displaying the first page of the conference material. The download request part 24 of the terminal apparatus 10 receives the download data of the page to be displayed first from the download process part 34 of the conference server apparatus 12.

After the download data of the page to be displayed first is downloaded to all the terminal apparatuses 10 operated by the respective participants (the finish of transmission), the process proceeds to step S15 and the conference is started in the conference system 1.

Thus, according to the conference system 1 of the first embodiment, a conference can be started at the time when a page to be first displayed is downloaded. Therefore, according to the conference system 1 of the first embodiment, it is possible to remarkably advance the start of a conference in comparison to a case where a conference is started after all the pages are downloaded. For example, according to the conference system 1 of the first embodiment, in a case where conference material includes 100 pages, a time required for the start a conference can be reduced to about one-hundredth in comparison to downloading all the pages of conference material before the start of the conference.

Then, the remaining pages other than the page to be displayed first (the remaining part of the conference material) are downloaded to each terminal apparatus 10 from the conference server apparatus 12 as a background process in step S16 after the start of the conference.

<<Negotiation>>

Figure 5:
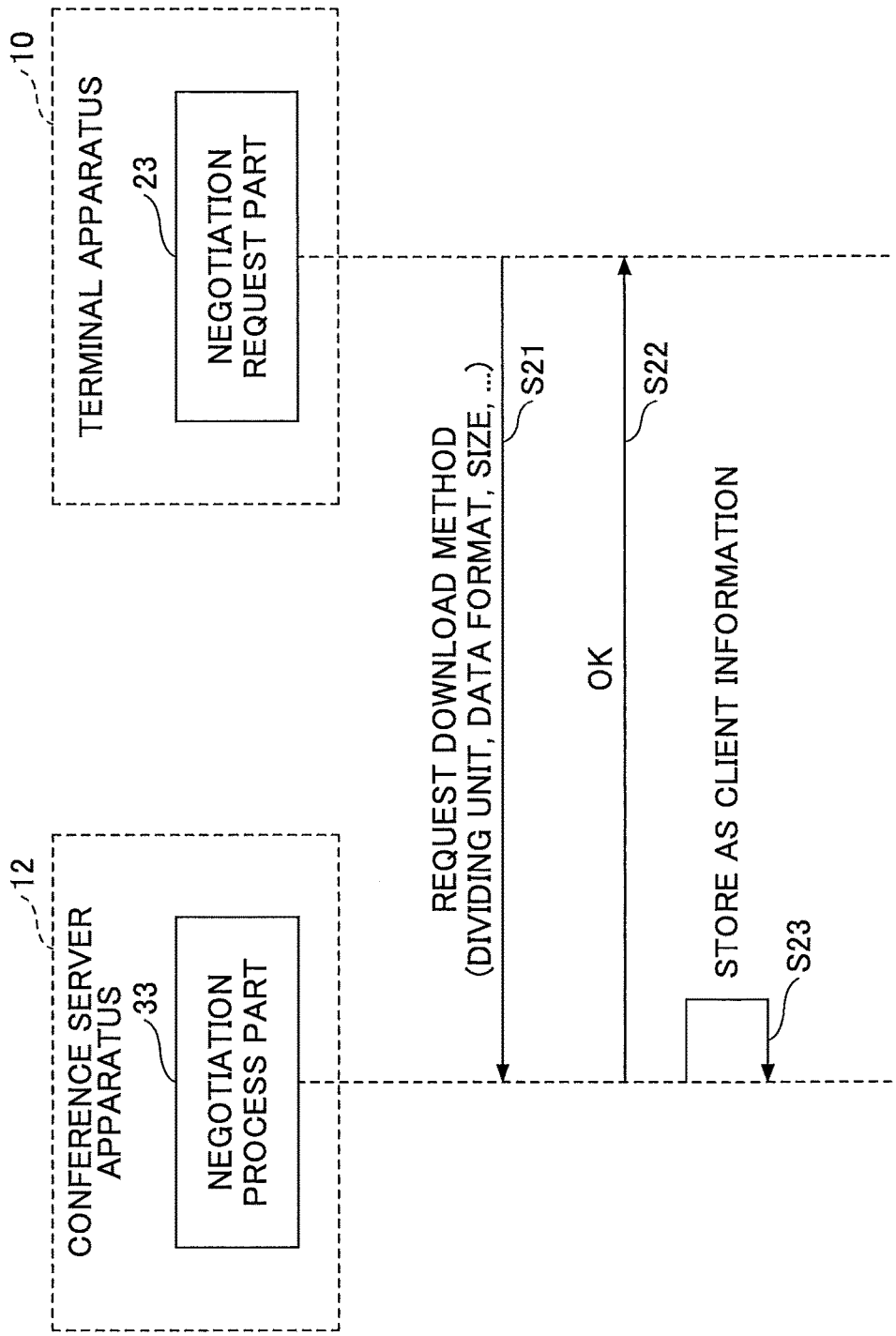
FIG. 5 is a sequence diagram of one example of a negotiation process.

"Negotiation" of step S13 of FIG. 4 is carried out, for example, as shown in a sequence diagram of FIG. 5. FIG. 5 is a sequence diagram of one example of a negotiation process.

In step S21, the negotiation request part 23 of the terminal apparatus 10 sends a request for a download method to the negotiation process part 33 of the conference server apparatus 12 for carrying out negotiation to determine the download method. The request for a download method sent by the terminal apparatus 10 includes, as designated items, for example, a dividing unit of dividing conference material, a data format, a display size and so forth. Note that default values, for example, can be used for items not included in the request for a download method sent from the terminal apparatus 10.

Note that the contents of a request for a download method transmitted from the terminal apparatus 10 are not limited to those described above. For example, the contents of the request for a download method can be information indicating the type of the terminal apparatus 10. For example, it is possible that type identification information for identifying the type of the transmission terminal 10 such as a smartphone, a portable phone, an electronic blackboard, a PC, a tablet terminal, a projector, a conference terminal or the like is transmitted from the terminal apparatus 10 to the conference server apparatus 12 as the contents of a request for a download method.

In such a case, a table in which respective download methods (dividing units, data formats, display sizes and/or the like) are associated with respective types of the terminal apparatuses 10 is previously stored in the client information storage part 40. By such a configuration, the conference server apparatus 12 can determine a download method based on received type identification information.

Further, it is also possible that the contents of a request for a download method are terminal identification information, unique to each terminal apparatus, for identifying the terminal apparatus 10. In such a case, a table in which respective download methods (dividing units, data formats, display sizes and/or the like) are associated with respective terminal apparatuses 10 is previously stored in the client information storage part 40. By such a configuration, the conference server apparatus 12 can determine a download method based on received terminal identification information.

Further, it is also possible that the contents of a request for a download method are display method identification information for identifying a method of displaying information in the terminal apparatus 10. Specific examples of the method of displaying information include a method of displaying information using a Web browser, a method of displaying information using an application installed in the terminal apparatus 10, and so forth. In such a case, a table in which respective download methods (dividing units, data formats, display sizes and/or the like) are associated with respective sets of display method identification information for identifying a method of displaying information in the terminal apparatus 10 is previously stored in the client information storage part 40. By such a configuration, the conference server apparatus 12 can determine a download method based on received display method identification information.

When the conference server apparatus 12 is capable of implementing the designated items of the request for a download method thus sent from the terminal apparatus 10, the negotiation process part 33 of the conference server apparatus 12 proceeds to step S22 and responds to the request for a download method by indicating to be capable of implementing the designated item by sending a message "OK" or the like to the terminal apparatus 10. The process of step S22 can be omitted.

In step S23, the negotiation process part 33 of the conference server apparatus 12 stores the designated items of the request for a download method as client information in the client information storage part 40 as shown in FIG. 6. Note that when a download method to implement is previously stored in the client information storage part 10 as mentioned above, it is not necessary to store information concerning a download method in step S23.

FIG. 6 is a configuration diagram of one example of client information. As shown in FIG. 6, the client information includes, as (designated) items, a client ID, a dividing unit, a data format, a size, cache information and so forth. A client ID is identification information uniquely identifying each terminal apparatus 10. A client ID can be a session ID designated along with an establishment of a communication session between the terminal apparatus 10 and the conference server apparatus 12. It is also possible that a client ID is the address information of the terminal apparatus 10. A dividing unit is a unit of dividing conference material and is, for example, "page by page". A data format is a data format of download data and is, for example, "JPEG format". The format is not limited to the "JPEG format" and can be a "PDF format", for example.

A "size" is the number of pixels of "download data" and is, for example, "1024×768 pixels". "Cache information" includes information concerning the number of cacheable pages, information concerning an algorithm for determining a page to be cached, and/or the like.

Thus, in negotiation of step S13 of FIG. 4, it is possible to designate various combinations of a dividing unit of dividing conference material, a data format, a size, and/or the like, to the conference server apparatus 12 from the terminal apparatus 10.

Note that, in negotiation of step S13, it is also possible that, based on "cache information" of the terminal apparatus 10, the conference server apparatus 12 determines a dividing unit of dividing conference material, a data format, a size and/or the like. In this case, it is possible that the conference server apparatus 12 receives "cache information" from the terminal apparatus 10 and determines, according to the received cache information, a dividing unit of dividing conference material, a data format, a size and/or the like. Note that "cache information" depends, for example, the capability of the hardware of the terminal apparatus 10. Thus, a download method of downloading conference material determined through negotiation is a process according to the capability of each terminal apparatus 10 which may be different for each terminal apparatus 10.

<<Downloading Page to be First Displayed>>

Figure 7:
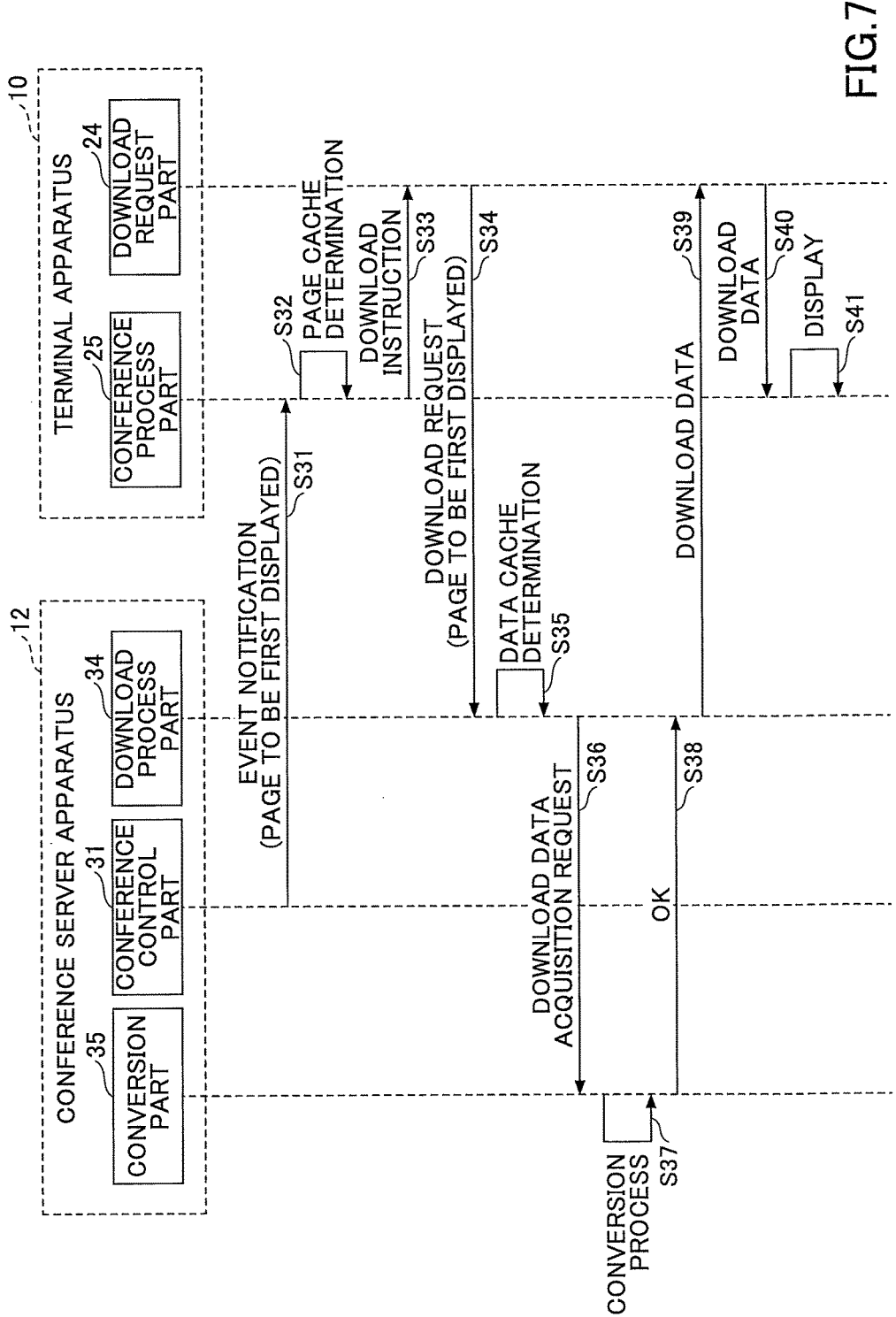
FIG. 7 is a sequence diagram of one example of a process of downloading a page to be displayed first.
Figure 14:
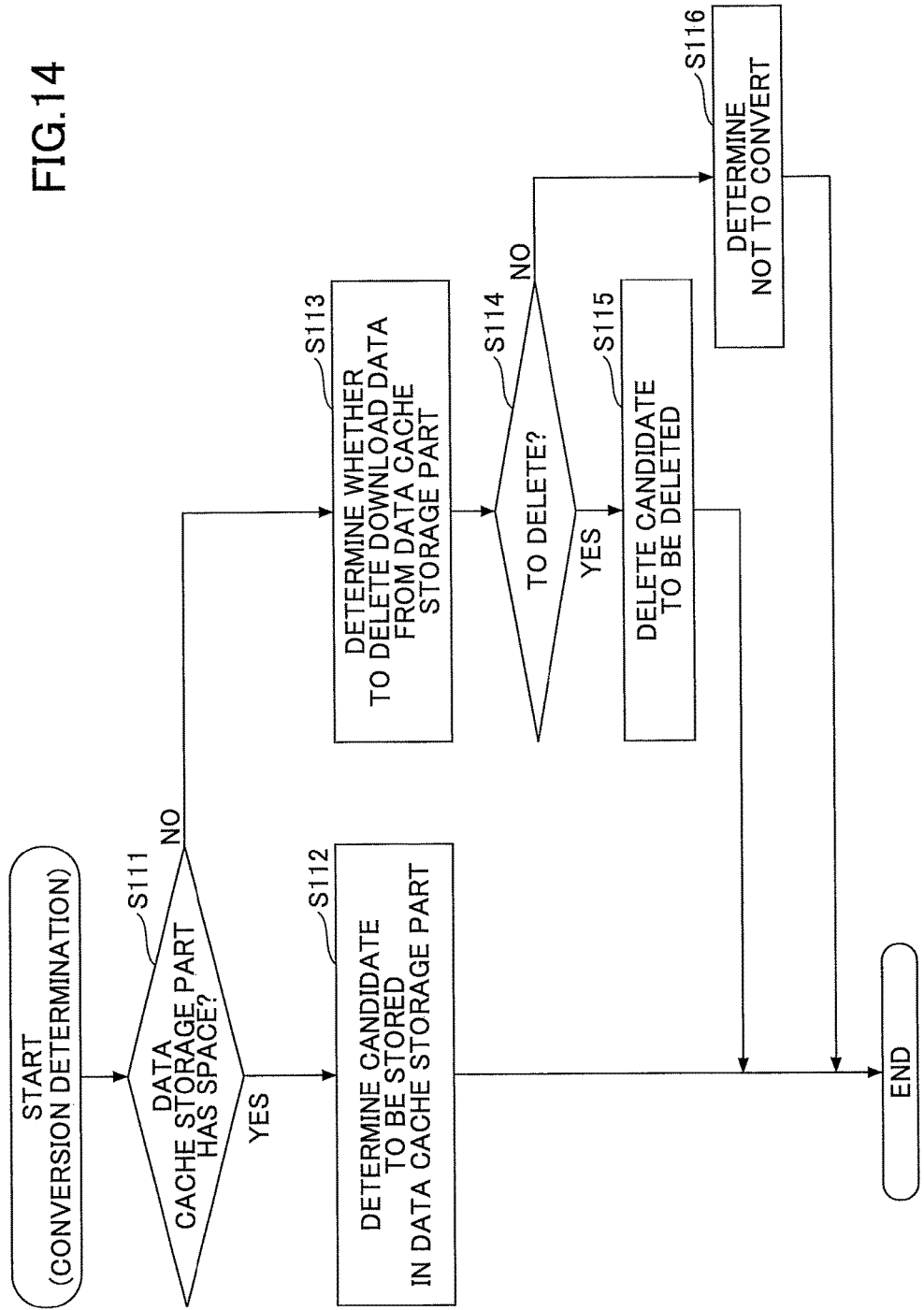
FIG. 14 is a flowchart of one example of a conversion determination process of determining whether it is necessary to carry out a conversion process.

Downloading a page to be first displayed in step S14 of FIG. 14 is carried out, for example, as shown in FIG. 7. FIG. 7 is a sequence diagram of one example of a process of downloading a page to be displayed first.

To the terminal apparatus 10 that has finished negotiation in step S13, the conference control part 31 of the conference server apparatus 12 sends a conference material display event notification in which a page to be displayed is designated, in step S31.

In step S32, the conference process part 25 of the terminal apparatus 10 determines whether download data corresponding to the page of the conference material designated in step S31 is stored in the page cache storage part 27. Here, it is assumed that the download data corresponding to the designated page of the conference material is not stored in the page cache storage part 27.

In step S33, the conference process part 25 sends an instruction to the download request part 24 to download the download data corresponding to the designated page of the conference material. In step S34, the download request part 24 requests the download process part 34 of the conference server apparatus 12 to download the download data corresponding to the designated page of the conference material to the terminal apparatus 10.

In step S35, the download process part 34 of the conference server apparatus 12 determines whether the download data corresponding to the designated page of the conference material is stored in the data cache storage part 41. Here, it is assumed that the download data corresponding to the designated page of the conference material is not stored in the data cache storage part 41.

In step S36, the download process part 34 requests the conversion part 35 to acquire the download data corresponding to the designated page of the conference material through conversion. In step S37, the conversion part 35 carries out conversion using conference material to acquire download data corresponding to the designated page (to be displayed first) of the conference material based on the client information corresponding to the terminal apparatus 10 that is the request source.

After the finish of the conversion, in step S38, the conversion part 35 responds to the request by indicating that the conversion to acquire download data corresponding to the designated page of the conference material is finished by, for example, sending a message "OK" or the like to the download process part 34. In step S39, the download process part 34 transmits the thus acquired download data corresponding to the designated page of the conference material requested by the download request part 24 of the terminal apparatus 10 to the download request part 24.

In step S40, the download request part 24 transmits the download data corresponding to the designated page of the conference material to the conference process part 25. In step S41, the conference process part 25 displays the download data corresponding to the designated page of the conference material on the display device 502 or the like, and carries out a synchronous display of the conference material with the other terminal apparatuses 10.

Figure 8:
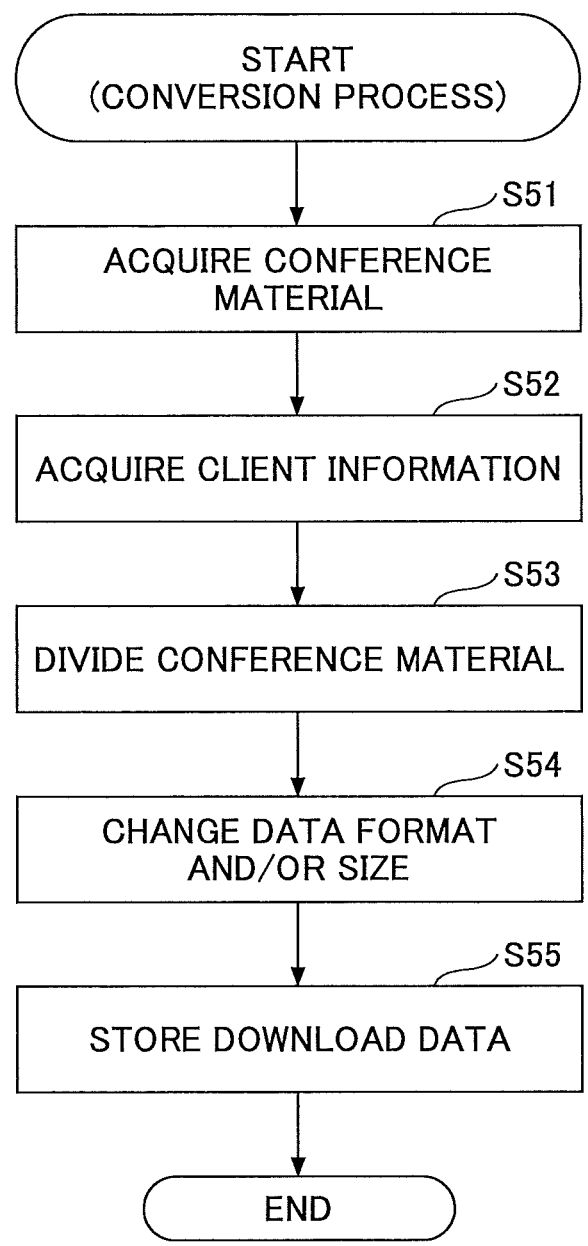
FIG. 8 is a flowchart of one example of a conversion process of converting conference material into download data.

Note that the conversion process of step S37 of FIG. 7 can be carried out, for example, as shown in FIG. 8. FIG. 8 is a flowchart of one example of a conversion process of converting conference material into download data.

In step S51, the conversion part 35 acquires the designated page of the conference material from the conference material storage part 38. In step S52, the conversion part 35 acquires the client information corresponding to the terminal apparatus 10 that is the request source sending the download request in step S34 of FIG. 7.

In step S53, the conversion part 35 divides the conference material to acquire a division including the designated page of the conference material based on the "dividing unit" of the client information and the designated page of the conference material. In step S54, the conversion part 35 converts the data format and the size of the thus acquired division of the conference material into those according to the client information to acquire download data.

In step S55, the conversion part 35 stores the thus acquired download data in the data cache storage part 41. Note that it is also possible that the thus acquired download data is stored in the the conference system 1 in the first embodiment, it is also possible that, in order to reduce a time required to acquire "download data", conversion is previously carried out to acquire download data for typical dividing unit, data format and size and store the thus acquired download data.

<<Downloading Remaining Pages>>

Figure 9:
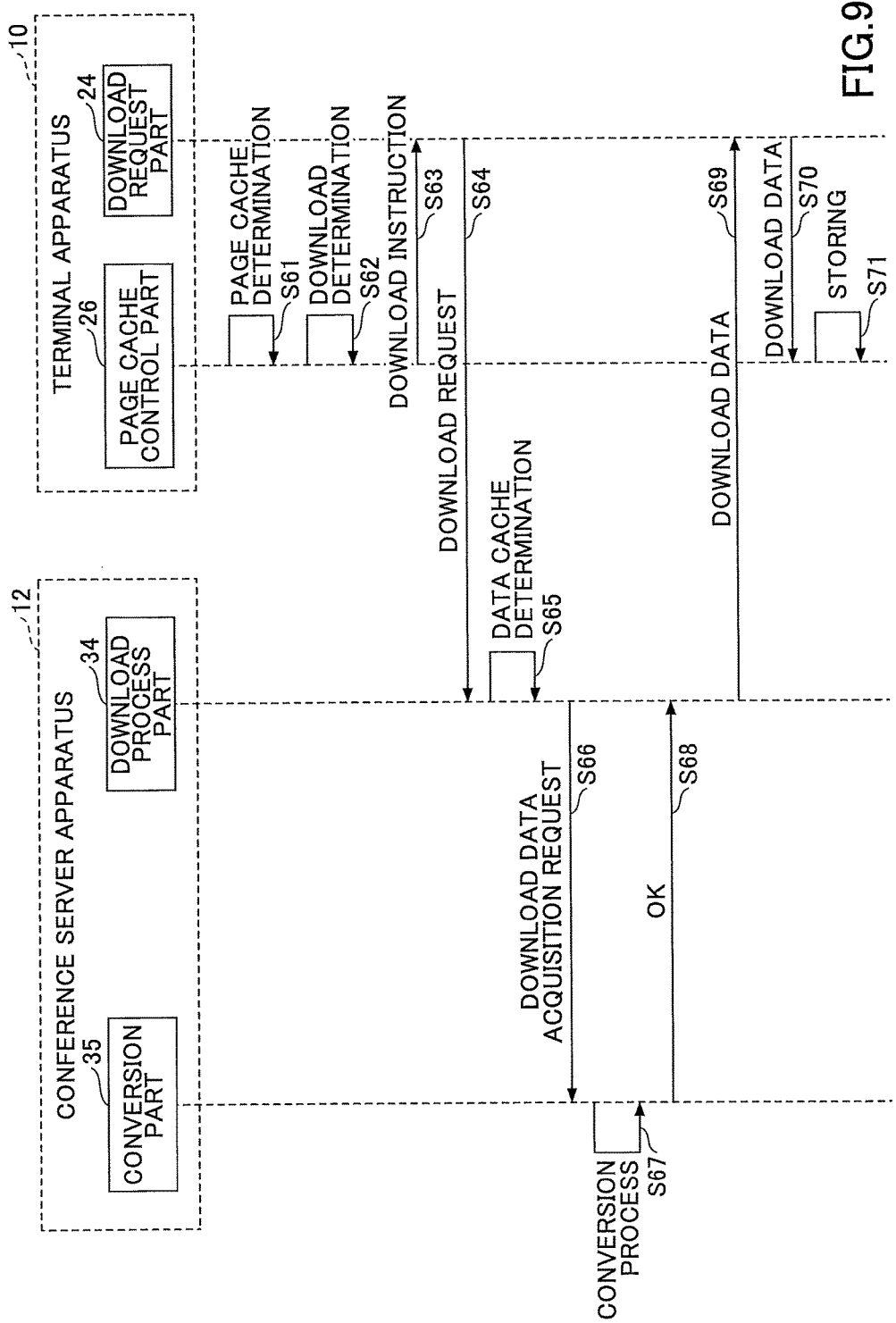
FIG. 9 is a sequence diagram of one example of a process of downloading the remaining pages.

"Downloading remaining pages" in step S16 of FIG. 4 is carried out, for example, as shown in FIG. 9. FIG. 9 is a sequence diagram of one example of a process of downloading remaining pages. After the start of the conference, each terminal apparatus 10 carries out the process of FIG. 9 in an arbitrary timing and thus, can receive the remaining pages of download data from the conference server apparatus 12.

In step S61, the page cache control part 26 checks download data stored in the page cache storage part 27 and the space area in the page cache storage part 27. In step S62, the page cache control part 26 determines whether it is necessary to carry out downloading as will be described later. Here, it is assumed that the page cache control part 26 determines it is necessary to download.

When thus determining it is necessary to download, the page cache control part 26 sends an instruction to the download request part 24 to download "download data" of a page of the conference material thus determined necessary to download, in step S63. In step S64, the download request part 24 requests the download process part 34 of the conference server apparatus 12 to download the download data of the page of the conference material thus determined necessary to download to the terminal apparatus 10.

In step S65, the download process part 34 of the conference server apparatus 12 determines whether the download data thus requested by the terminal apparatus 10 is stored in the data cache storage part 41. Here, it is assumed that the requested download data is not stored in the data cache storage part 41. In step S66, the download process part 34 requests the conversion part 35 to carry out conversion to acquire the download data of the requested page of the conference material.

In step S67, the conversion part 35 carries out conversion to acquire the download data of the requested page of the conference material based on the client information corresponding to the terminal apparatus 10 that is the request source. When the conversion process is thus finished, the conversion part 35 responds to the request to indicate that the conversion to acquire the download data of the requested page of the conference material is finished by, for example, sending a message "OK" or the like to the download process part 34 in step S68.

In step S69, the download process part 34 transmits the download data corresponding to the page of the conference material requested by the download request part 24 of the terminal apparatus 10 to the download request part 24.

In step S70, the download request part 24 transmits the download data corresponding to the designated page of the conference material to the page cache control part 26. In step S71, the page cache control part 26 stores the download data of the page of the conference material determined necessary in the page cache storage part 27.

Figure 10:
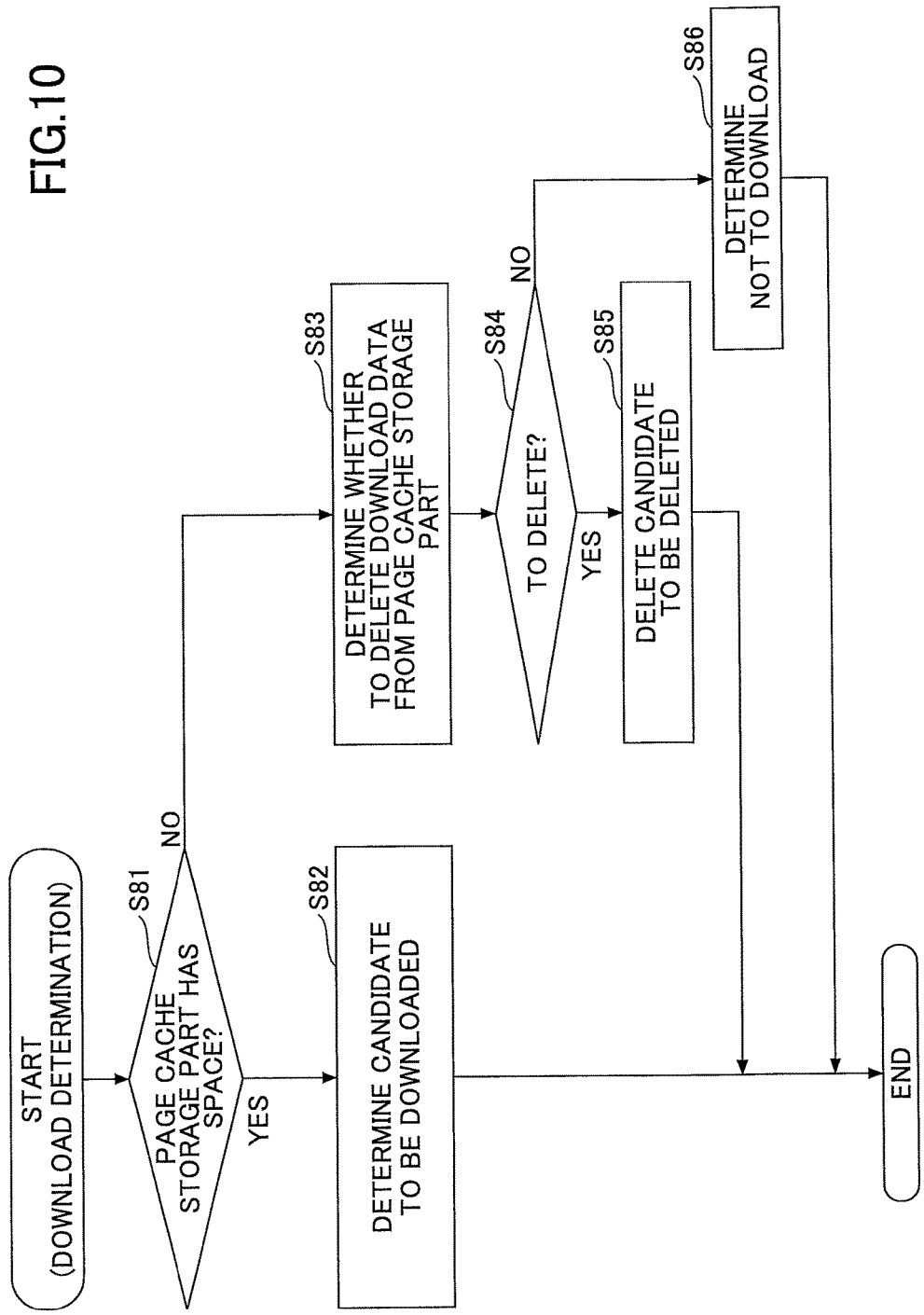
FIG. 10 is a flowchart of one example of a download determination process of determining whether it is necessary to carry out downloading.
Figure 11:
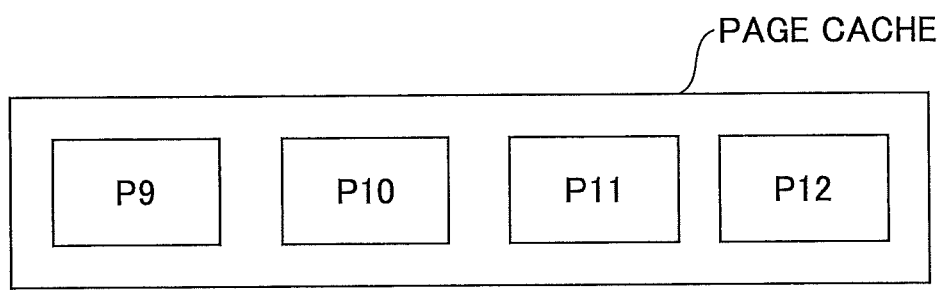
FIG. 11 is a configuration diagram of one example of a page cache storage part.

Note that determination as to whether it is necessary to download (download determination) in step S62 of FIG. 9 can be carried out, for example, as shown in FIG. 10. FIG. 10 is a flowchart of one example of a download determination process of determining whether it is necessary to carry out downloading. FIG. 11 is a configuration diagram of one example of the page cache storage part.

In step S81, the page cache control part 26 determines whether the page cache storage part 27 such as that shown in FIG. 11 has a space area. Note that the page cache storage part 27 shown in FIG. 11 indicates that the number of cacheable pages is "4", for example, and indicates that the page cache storage part 27 has no space area, for example. When the terminal apparatus 10 is displaying page 10, the page cache storage part 27 of FIG. 11 stores, for example, download data of pages 9, 11 and 12 near the currently displayed page 10 in addition to download data of page 10.

When the page cache storage part 27 of FIG. 11 has a space area (YES), the page cache control part 26 proceeds to step S82. In step S82, the page cache control part 26 determines a page likely to be required (i.e., important page) such as a page near the currently displayed page as a candidate to be downloaded. Note that it is also possible that, in step S82, a candidate for download data is determined in such a manner not to store duplicate download data in the page cache storage part 27.

For example, the page cache control part 26 determines, as a candidate to be downloaded, download data of a page most likely to be required subsequently due to a user's operation such as "paging", such as a page nearer the page currently displayed on the display device 50 or the like.

On the other hand, in step S81, when determining that the page cache storage part 27 has no space area (NO), the page cache control part 26 proceeds to step S83. In step S83, the page cache control part 26 determines whether to delete download data of a page of the conference material stored in the page cache storage part 27.

For example, the page cache control part 26 determines as a candidate to be deleted, download data of a page least likely to be required subsequently due to a user's operation such as "paging", such as a page farthest from the page currently displayed on the display device 50 or the like.

Further, the page cache control part 26 determines, as a candidate to be downloaded (a candidate for download data), download data most likely to be required subsequently from among the download data not stored in the page cache storage part 27.

The page cache control part 26 determines to delete the candidate to be deleted when the candidate to be downloaded is more likely to be required subsequently than the candidate to be deleted.

When the page cache control part 26 thus determines to delete the candidate to be deleted (YES), the page cache control part 26 proceeds to step S85 from step S84, and deletes the candidate to be deleted from the page cache storage part 27.

On the other hand, when determining not to delete the candidate to be deleted (NO), the page cache control part 26 proceeds to step S86 from step S84, and determines it is unnecessary to download the candidate to be downloaded.

According to the process of downloading the remaining pages shown in FIG. 9, when the page cache storage part 27 has a space area, it is possible to previously download "download data" of a page (important page) likely to be required subsequently to the terminal apparatus 10 from the conference server apparatus 12.

Further, even when the page cache storage part 27 has no space area, it is possible to previously download "download data" of a page likely to be required subsequently to the terminal apparatus 10 from the conference server apparatus 12 by deleting download data less likely to be required subsequently to create a space area. When downloading download data likely to be required subsequently is thus finished, the process of downloading the remaining pages is interrupted (idling), which is restarted after an operation such as "paging" is carried out.

Figure 12:
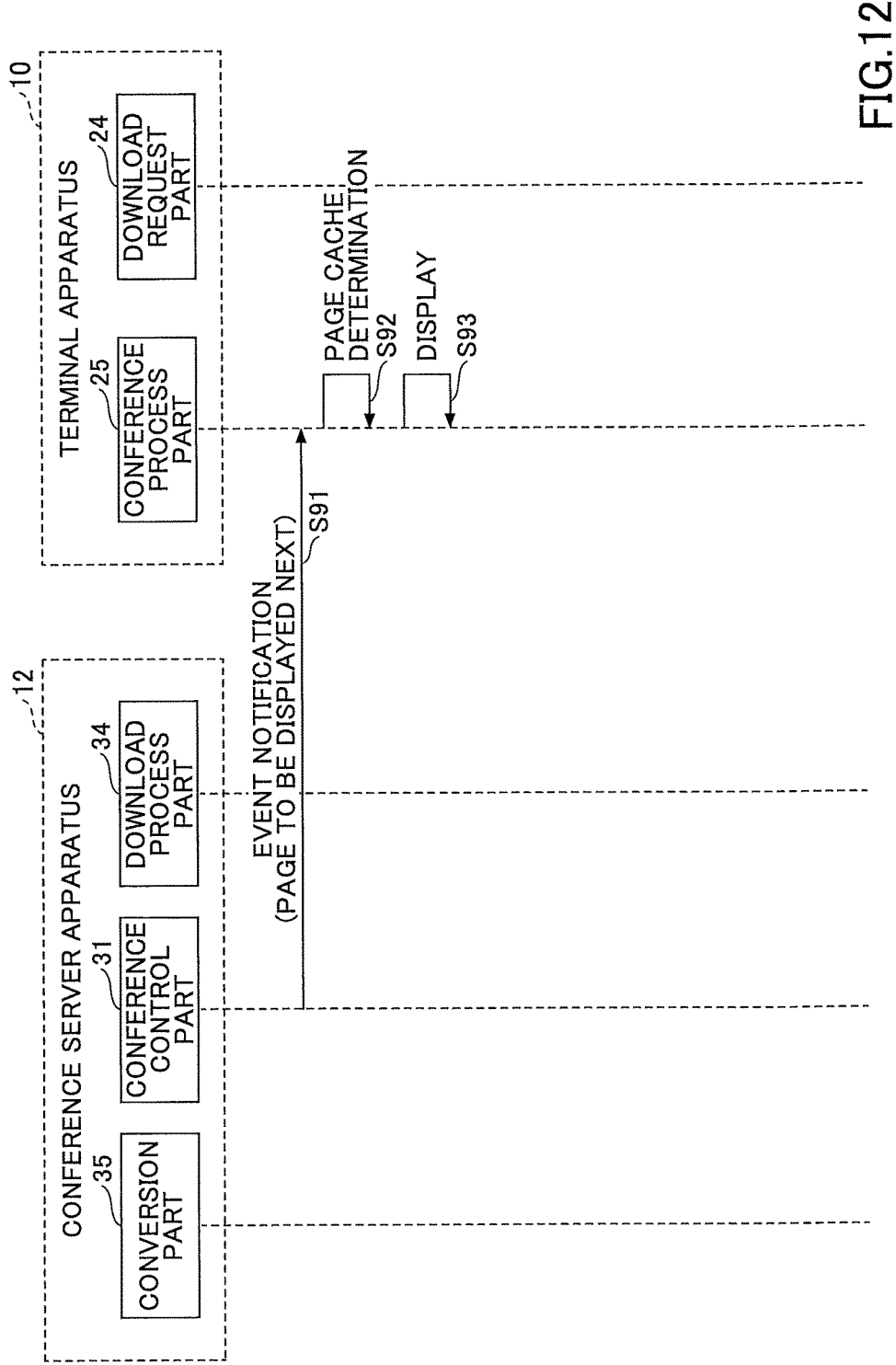
FIG. 12 is a sequence diagram of one example of a process when a page currently being displayed is changed.

In the conference system 1 according to the first embodiment, when an operation such as "paging" is carried out by the presenter and the page currently being displayed is thus changed, the page of the conference material currently being delayed on the display device of each terminal apparatus 10 is changed as shown in FIG. 12. FIG. 12 is a sequence diagram of one example of a process when the page currently being displayed is changed.

It is assumed that the conference server apparatus 12 receives information of an operation of "paging" from the presenter's terminal apparatus 10. In step S91, the conference control part 31 of the conference server apparatus 12 sends a conference material event notification in which the page to be subsequently displayed is designated, based on the received information of the operation of "paging" from the presenter's terminal apparatus 10.

In step S92, the conference process part 25 of the terminal apparatus 10 determines whether the download data corresponding to the page of the conference material designated in step S91 is stored in the page cache storage part 27. Here, it is assumed that the download data corresponding to the page of the conference material designated in step S91 is stored in the page cache storage part 27.

In step S93, the conference process part 25 acquires the download data corresponding to the page of the conference material designated in step S91 from the page cache storage part 27, displays the acquired page on the display device 502 or so, and then, carries out a "synchronous display" of the conference material with the other terminal apparatuses 10. Note that when the download data corresponding to the page of the conference material designated in step S91 is not stored in the page cache storage part 27 in step S92, the conference process part 25 executes the process starting from step S33 of FIG. 7 and acquires the download data corresponding to the designated page of the conference material. At this time, it is also possible that, as described above using FIGS. 9 and 10, the page cache control part 26 deletes download data less likely to be required subsequently from the page cache storage part 27 to create a space area.

According to the configuration system in the first embodiment, each terminal apparatus 10 carries out the process of FIG. 9 in an arbitrary timing, and thereby, receives the remaining pages of download data from the conference server apparatus 12. At this time, according to the conference system 1 in the first embodiment, such control can be employed that in order to avoid congestion in the network 14, a timing of downloading is made different among the respective terminal apparatuses 10 while band information is monitored.

By such control of thus making a timing of downloading different among the respective terminal apparatuses 10, the conference system 1 in the first embodiment comes to have a secondary advantageous effect of avoiding degradation in the performance otherwise occurring due to the band being pressed. Further, according to the conference system 1 in the first embodiment, under the control of the page cache control part 26, as a result of download data being stored in the page cache storage part 27, the pages of the conference material can be partially stored.

By thus caching download data in each terminal apparatus 10, it is expected to acquire high performance while requiring a reduced resource (a memory, a local disk and/or the like).

<<Data Cache>>

Figure 13:
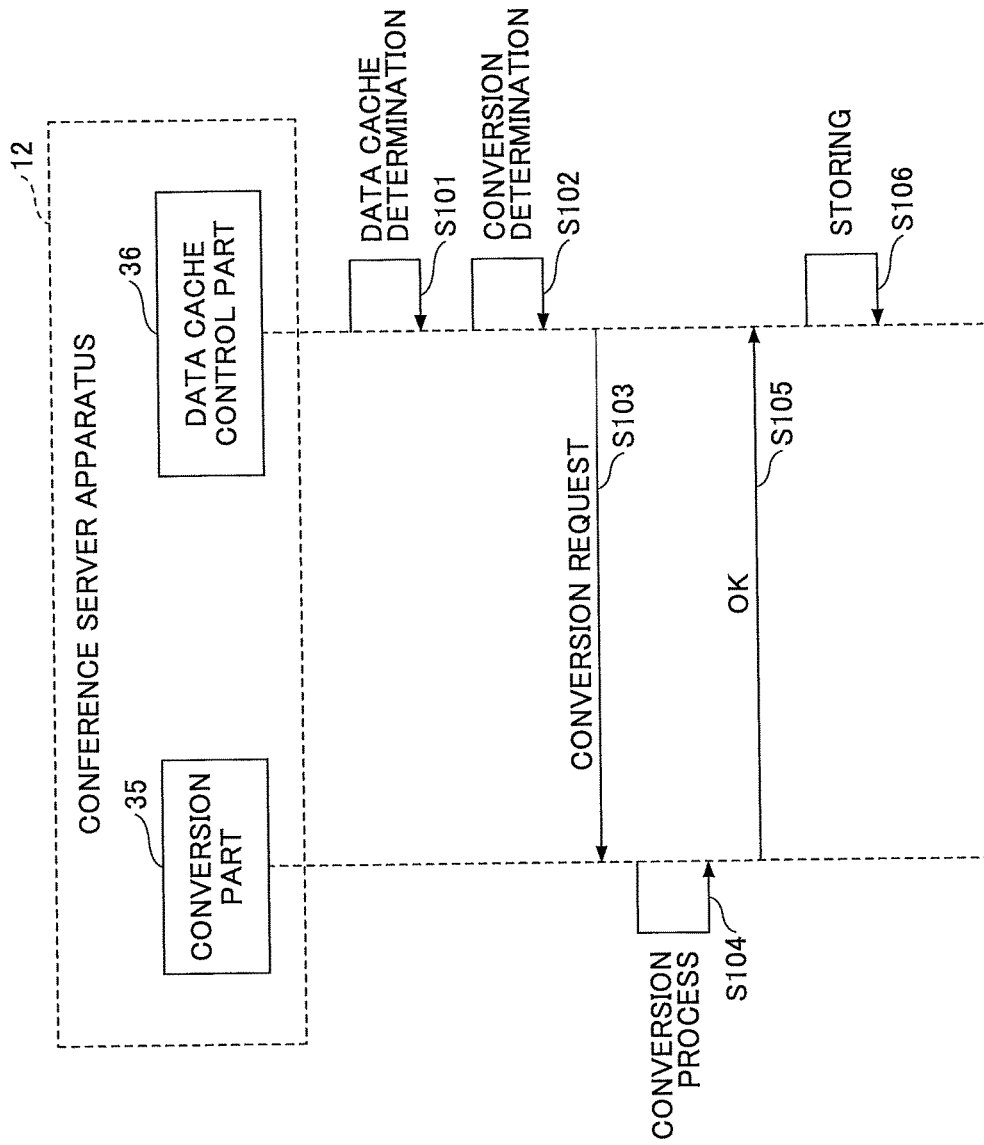
FIG. 13 is a sequence diagram of one example of a data cache process.

In the conference server apparatus 12, as shown in a sequence diagram of FIG. 13, for example, the data cache control part 36 controls download data stored in the data cache storage part 41. FIG. 13 is a sequence diagram of one example of a data cache process.

The conference server apparatus 12 can previously store download data likely to be required to download by each terminal apparatus 10 in the data cache storage part 41 by carrying out the process of FIG. 13 in an arbitrary timing.

In step S101, the data cache control part 36 checks the download data stored in the data cache storage part 41 and the space area of the data cache storage part 41. Further, in step S102, the data cache control part 36 determines, in a manner as will be described later, whether it is necessary to carry out a conversion process. Here, it is assumed that the data cache control part 36 determines it is necessary to carry out a conversion process.

When thus determining it is necessary to carry out a conversion process, the data cache control part 36 requests the conversion part 35 to carry out conversion to acquire a page of download data determined necessary to carry out a conversion process, in step S103.

In step S104, the conversion part 35 carries out conversion to acquire download data of the required page of the conference material based on the client information corresponding to each terminal apparatus 10. When the conversion process is thus finished, the conversion part 35 responds to the request in step S105 to indicate that the conversion of the requested page of the conference material is finished by, for example, sending a message such as "OK" to the data cache control part 36. In step S106, the data cache control part 36 stores the download data of the page of the conference material determined necessary to carry out a conversion process in the data cache storage part 41.

Figure 15:
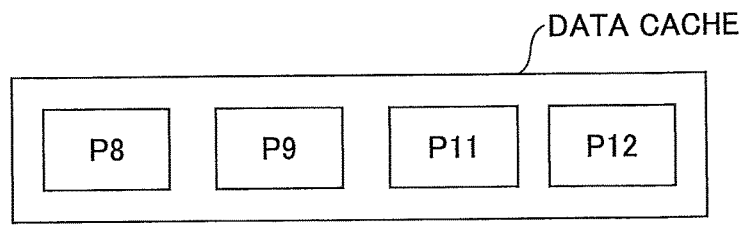
FIG. 15 is a configuration diagram of one example of a data cache storage part.

Note that determination as to whether it is necessary to carry out a conversion process in step S102 of FIG. 13 can be carried out, for example, as shown in FIG. 14. FIG. 14 is a flowchart of one example of a conversion determination process of determining whether it is necessary to carry out a conversion process. FIG. 15 is a configuration diagram of one example of the data cache storage part.

In step S111, the data cache control part 36 determines whether the data cache storage part 41 such as that shown in FIG. 15 has a space area. The data cache storage part 41 of FIG. 15 is an example where the number of cacheable pages is "4" and the data cache storage part 41 has no space area. The data cache storage part 41 of FIG. 15 stores download data of pages 8, 9, 11 and 12, for example, near page 10 when the terminal apparatus 10 is currently displaying page 10.

When the data cache storage part 41 of FIG. 15 has a space area (YES), the data cache control part 36 proceeds to step S112. In step S112, the data cache control part 36 determines download data of a page of the conference material likely to be required subsequently as a candidate for download data (download data to be acquired through a conversion process).

For example, based on information concerning the number of cacheable pages, the algorithm for determining pages to cache and/or the like included in the cache information of the client information, the data cache control part 36 determines a candidate for download data. Note that, in step S112, it is possible to determine a candidate for download data in such a manner not to store duplicate download data in the data cache storage part 41.

On the other hand, in step S111, when it is determined that the data cache storage part 41 has no space area (NO), the data cache control part 36 executes step S113. In step S113, the data cache control part 36 determines whether to delete the download data of a page of the conference material stored in the data cache storage part 41.

For example, the data cache control part 36 determines, as a candidate to be deleted, download data of a page least likely to be required subsequently due to an operation such as "paging", such as the page farthest from the page currently displayed by each terminal apparatus 10.

Further, the data cache control part 36 determines, as a candidate to be downloaded (candidate for download data), download data most likely to be required subsequently from among the download data not stored in the data cache storage part 41.

The data cache control part 36 determines to delete the candidate to be deleted when the candidate to be downloaded is more likely to be required subsequently than the candidate to be deleted.

When thus determining to delete the candidate to be deleted (YES), the data cache control part 36 proceeds to step S115 from step S114 and deletes the candidate to be deleted from the data cache storage part 41.

When determining not to delete the candidate to be deleted (NO), the data cache control part 36 proceeds to step S116 from step S114 and determines it is unnecessary to carry out a conversion process.

According to the data cache process shown in FIG. 13, it is possible to previously acquire a page of download data (having high importance) likely to be required through conversion and store it in the data cache storage part 41 when the data cache storage part 41 has a space area.

Further, even when the data cache storage part 41 has no space area, it is possible to acquire download data likely to be required subsequently through conversion and store it by deleting download data not likely to be required subsequently to create a space area. When conversion to acquire download data likely to be required subsequently is finished, the data cache process is interrupted (idling), which will be restarted after an operation such as "paging" is carried out.

Note that according to the conference system 1 of the first embodiment, in order to reduce the time required for conversion to acquire download data, it is possible to previously acquire download data through conversion for typical dividing unit, data format and size to store it in the data cache storage part 41.

<<Downloading Process>>

The conference server apparatus 12 receives requests to download from the respective terminal apparatuses 10. Therefore, the conference server apparatus 12 provides a download queue and uses the download queue to adjust the order of processing the requests from the respective terminal apparatuses 10, as shown in FIG. 16.

Figure 16:
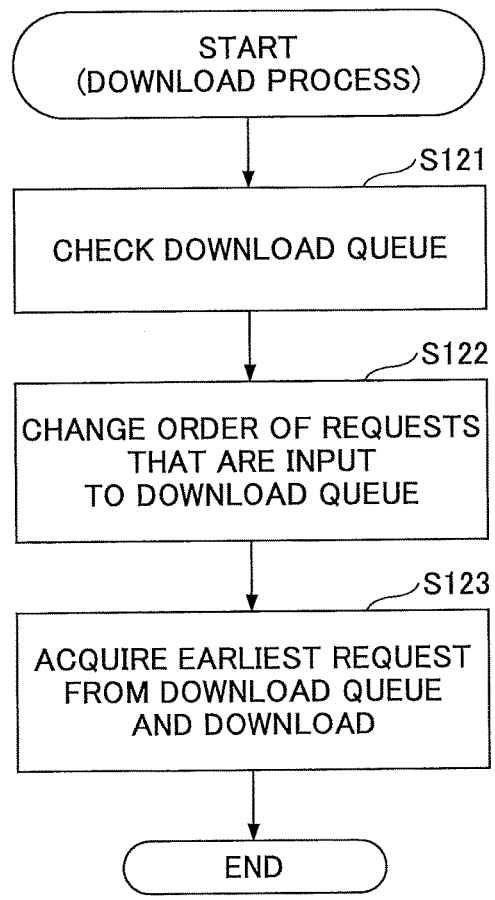
FIG. 16 is a flowchart of one example of a downloading process.

FIG. 16 is a flowchart of one example of a downloading process. In step S121, the download process part 34 checks requests from the respective terminal apparatuses 10 that are input to the download queue.

In step S122, the download process part 34 changes the order of the requests that are input to the download queue according to how much each request is likely to be required. For example, the download process part 34 changes the order of the requests that are input to the download queue in such a manner that a download request required by an event notification is given priority over a download request for the purpose of storing in the page cache storage part 27.

Further, the download process part 34 changes the order of the requests that are input to the download queue in such a manner that a download request that is to be given priority for absorbing capability differences of the terminal apparatuses 10 and/or those concerning the network 14 is given priority.

In step S123, the download process part 34 acquires the earliest download request from the download queue and transmits the download data corresponding to the download request to the terminal apparatus 10 that is the request source of the download request. According to the download process of FIG. 16, it is possible to change the order of processing the download requests in such a manner that a download request that is to be given priority will be preferentially processed.

Figure 17:
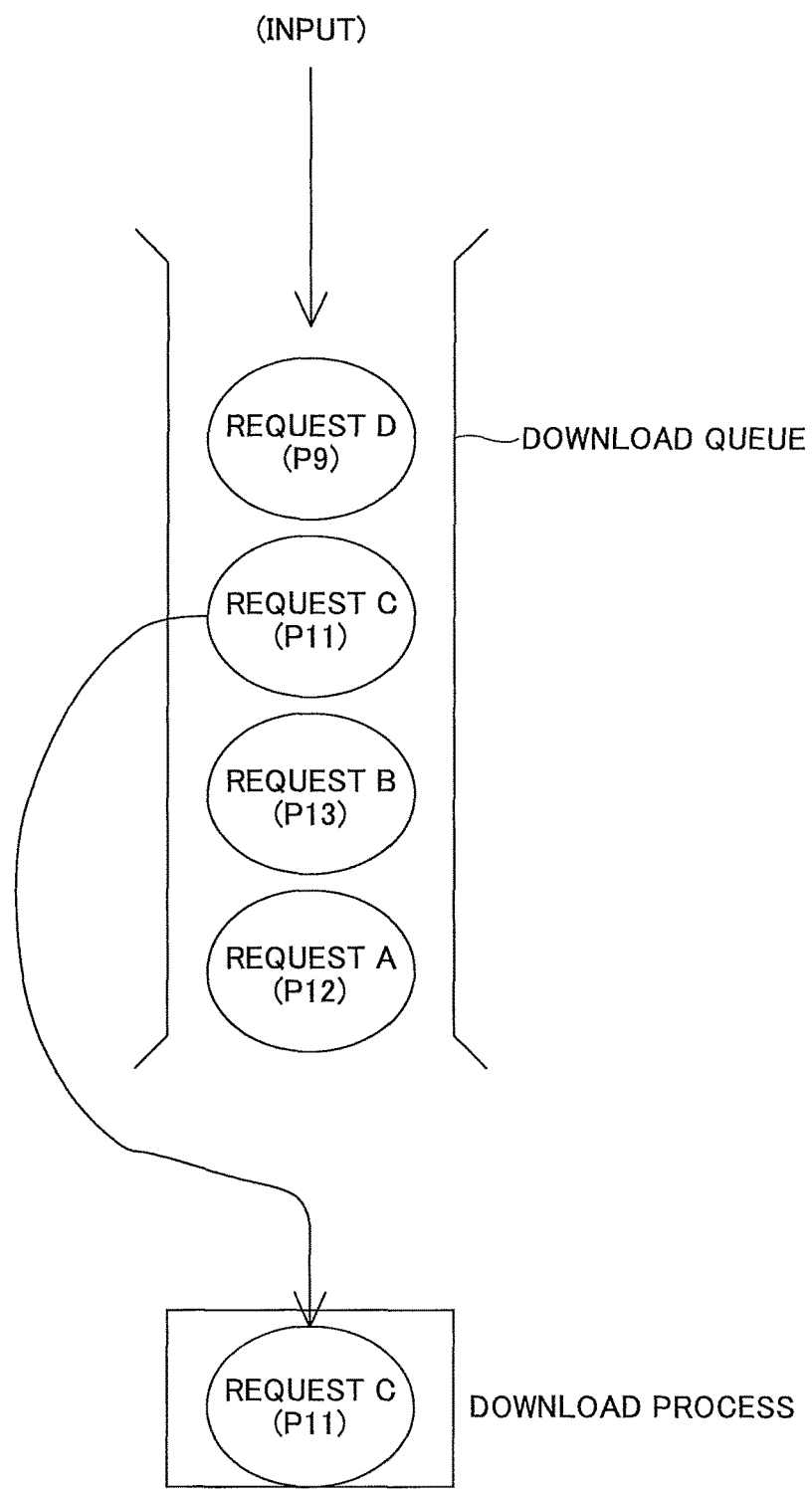
FIG. 17 illustrates operations of a download queue.

FIG. 17 illustrates operations of the download queue. As shown in FIG. 17, the download requests from the respective terminal apparatuses 10 are input to the download queue in the order of being input. The download process part 34 checks the requests from the respective terminal apparatuses 10 that are thus input to the download queue, takes a download request likely to be required and carries out the corresponding downloading process.

For example, when page 10 is being currently displayed, the download process part 34 acquires a request C (see FIG. 17) corresponding to the page 11 most likely to be required subsequently due to an operation such as "paging" from among the requests that are input to the download queue. Thus, according to the operations concerning the download queue shown in FIG. 17, it is possible to process download requests that are input to the download queue in the order as to how much the respective download requests are like to be required.

Second Embodiment

According to the first embodiment described above, download determination processes for controlling download data to be stored in the page cache storage part 27 are carried out at the side of the terminal apparatuses 10. According to the second embodiment, a download determination process is carried out at the side of the conference server apparatus 12. The conference system 1 according to the second embodiment is implemented by, for example, a functional block shown in FIG. 18.

Figure 18:
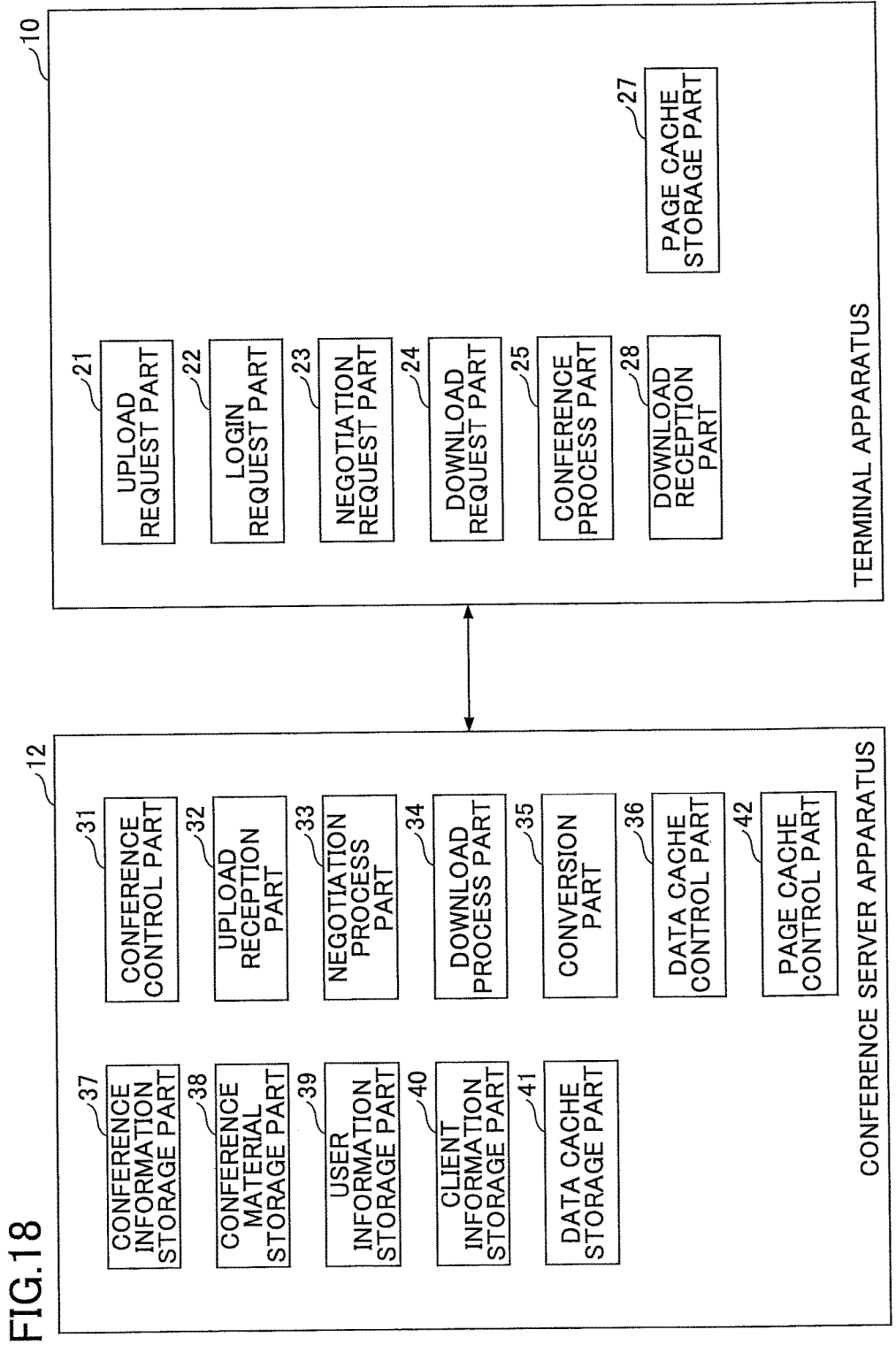
FIG. 18 is a functional block diagram of one example of a conference system according to a second embodiment.

FIG. 18 is a functional block diagram of one example of the conference system according to the second embodiment. In the terminal apparatus 10 of FIG. 18, the page cache control part 26 in the terminal apparatus 10 shown in FIG. 3 is replaced by a download reception part 28. Further, in the conference server apparatus 12 of FIG. 18, a page cache control part 42 is added to the conference server apparatus 12 shown in FIG. 3.

Figure 19:
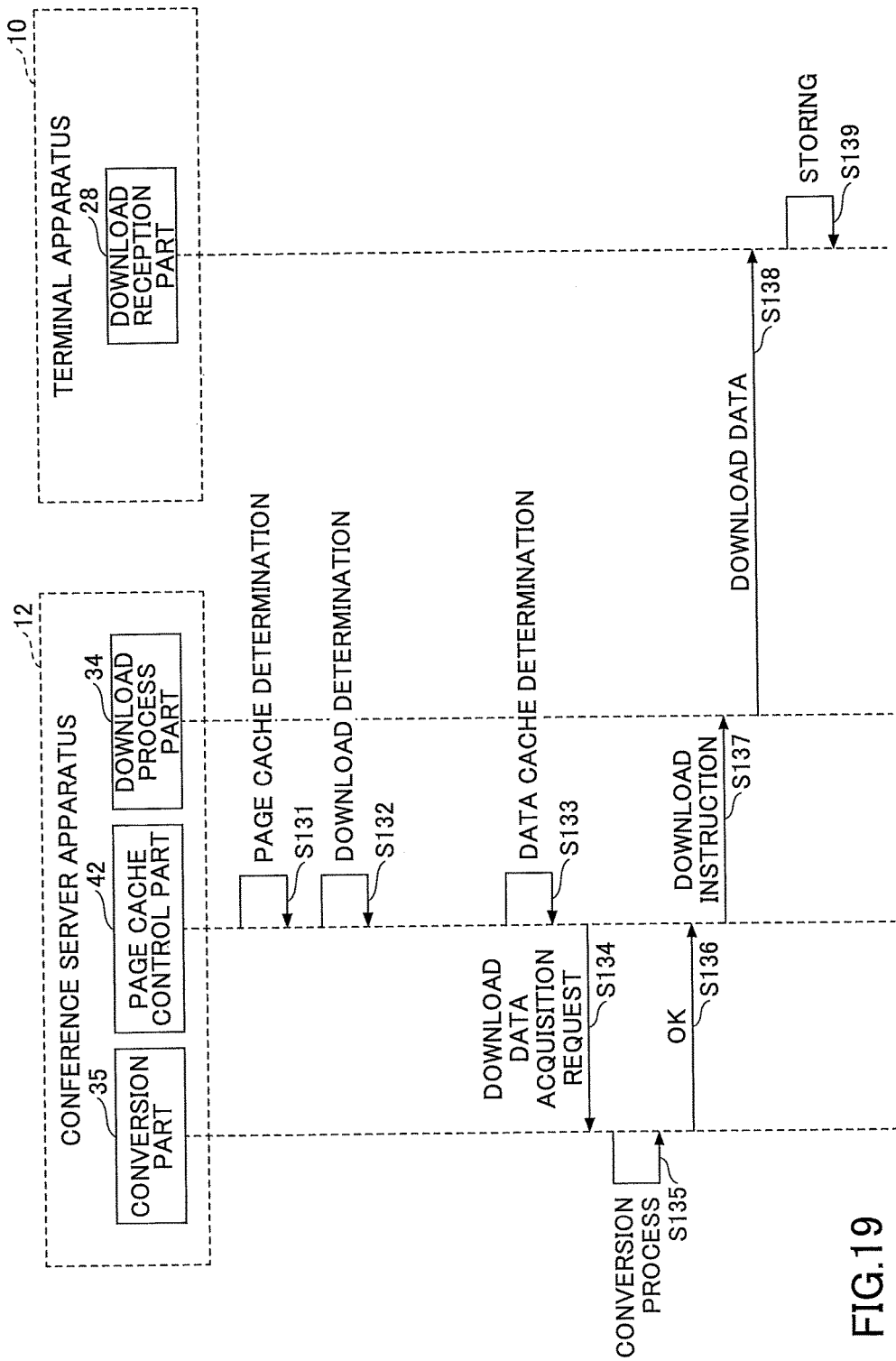
FIG. 19 is a sequence diagram of one example of a process of downloading the remaining pages according to the second embodiment.

According to the second embodiment, the process of downloading the remaining pages of FIG. 9 according to the first embodiment is carried out as shown in FIG. 19. FIG. 19 is a sequence diagram of one example of a process of downloading the remaining pages according to the second embodiment. After the conference is started, the conference server apparatus 12 carries out the process of FIG. 19 in an arbitrary timing to be able to transmit download data of the remaining pages to the respective the terminal apparatuses 10.

In step S131, the page cache control part 42 checks the download data stored in the page cache storage part 27 and the space area of the page cache storage part 27 for each of the terminal apparatuses 10. In step S132, the page cache control part 42 determines whether it is necessary to carry out downloading, as described with FIG. 10. Here, it is assumed that the page cache control part 42 determines it is necessary to carry out downloading.

When determining it is necessary to carry out downloading, the page cache control part 42 determines, in step S133, whether the download data thus determined necessary to download, is stored in the data cache storage part 41. Here, it is assumed that the download data thus determined necessary to download, is not stored in the data cache storage part 41.

In step S134, the page cache control part 42 requests the conversion part 35 to acquire the download data thus determined necessary to download through conversion. The conversion part 35 then carries out conversion to acquire the download data determined necessary to download based on the client information corresponding to the terminal apparatus 10 to which the acquired download data is to be transmitted, in step S135. When the conversion process is finished, the conversion part 35 responds to the request to indicate that the conversion to acquire the download data determined necessary to download is finished by, for example, sending a message "OK" to the page cache control part 42 in step S136.

In step S137, the page cache control part 42 sends an instruction to the download process part 34 to download the download data determined necessary to download. In step S138, the download process part 34 transmits the download data, determined necessary to download, to the download reception part 28 of the terminal apparatus 10.

In step S139, the download reception part 28 stores the download data received from the conference server apparatus 12 in the page cache storage part 27. Note that, when the download data determined necessary to download is already stored in the data cache storage part 41 in step S133, the page cache control part 42 skips steps S134-S136 and executes step S137.

According to the second embodiment, the terminal apparatuses 10 does not need to carry out download determination processes, and thus, it is possible to reduce the processing loads of the terminal apparatuses 10.

Third Embodiment

According to the first embodiment, download determination processes for controlling download data to be stored in the page cache storage part 27 are carried out at the side of the terminal apparatuses 10. According to the second embodiment, a download determination process is carried out at the side of the conference server apparatus 12. According to the third embodiment, the terminal apparatuses 10 which carry out download determination processes and the other terminal apparatuses 10 which use a download determination process carried out at the side of the conference server apparatus 12 are mixed.

In the conference system 1 according to the third embodiment, at the side of the conference server apparatus 12, it is necessary to understand who carries out a download determination process ("who controls page cache"). For this purpose, the conference server apparatus 12 stores the client information such as that shown in FIG. 20 in the client information storage part 40.

FIG. 20 is a configuration diagram of one example of client information according to the third embodiment. The client information of FIG. 20 has, in addition to the items of client information of FIG. 6, an item "who controls page cache". "Who controls page cache" included in client information of FIG. 20 indicates an apparatus which carries out a download determination process in a correspondence relationship between the conference server apparatus 12 and the terminal apparatus 10. The conference server apparatus 12 can understand, for which of the terminal apparatuses 10 it is necessary to carry out a download determination process, by checking the item "who controls page cache" included in the client information of each terminal apparatus 10.

Summary of Embodiments

The above-described embodiments of the present invention can be applied to conference systems in which conference material is electrically distributed to the participants of a conference and the conference is presented while the participants view the distributed conference material from their own terminal apparatuses 10. Other than such conference systems 1, the embodiments can be also applied to seminar systems or lesson systems in which material is electrically distributed to students of a seminar or a lesson and the seminar or the lesson is presented while the students view the distributed material from their own terminal apparatuses 10.

For example, in a conference system 1 in which conference material is electrically distributed and a conference is presented while the conference material is viewed by participants from the respective terminal apparatuses 10, it is desired that in order to save the time and start the conference as soon as possible, the conference material is distributed to all the participants within a short time. Further, as a conference held in such a conference system 1, there is a conference where conference material is to be distributed only to appropriate ones of the participants or a conference where conference material is to be withdrawn after the conference.

Therefore, in a conference system 1, it may be important to distribute conference material rapidly and securely. In the conference system 1, conference material is previously uploaded to a conference server apparatus 12. The participants of a conference login to the conference server apparatus 12 from their own terminal apparatuses 10, respectively, when the time has come to start the conference. The participants of the conference download the conference material to their own terminal apparatuses 10, respectively. After all the participants finish downloading the conference material, the conference is started.

Note that conference systems 1 according to the embodiments assume to download conference material after the start of a conference in order to consider such a conference that conference material may be modified immediately before the start of the conference and such a conference that conference material should be withdrawn after the conference is finished. Therefore, according to the conference systems 1 of the embodiments, a conference is to be started within a short time whereas the conference is such that download of conference material is started after a start of the conference.

For this purpose, specifically, according to the conference systems 1 of the embodiments, conference material is downloaded in such a manner that the conference material is divided, and a conference is started at a time when one division of the conference material has been downloaded. Thereby, in comparison to a case of downloading all of the conference material at once, it is possible to shorten the time required for starting the conference. The remaining divisions of the conference material are downloaded through a background process after the start of the conference from the conference server apparatus 12 to the respective terminal apparatuses 10.

Further, the conference systems 1 according to the embodiments are advantageous also from a security viewpoint, since download data less likely to be required subsequently, from among the download data that is downloaded to each terminal apparatus 10, is deleted in sequence.

The information processing systems, information processing apparatuses, terminal apparatuses and information transmission methods have been described in the embodiments. However, the present invention is not limited to the specifically disclosed embodiments, and variations and modifications may be made without departing from the scope of the present invention. Note that the conference server apparatus 12 is one example of an information processing apparatus. The conference system 1 is one example of an information processing system.

Further, the download request part 24 and the download process part 34 are one example of a transmission part. The conference process part 25 is one example of a display process part. The negotiation request part 23 and the negotiation process part 33 are one example of a determination part. The page cache storage part 27 is one example of a transmission information storage part. The page cache control part 26 is one example of a transmission information storage control part. The data cache storage part 41 is one example of a look-ahead transmission information storage part. The data cache control part 36 is one example of a look-ahead transmission information storage control part.

Note that, the conference systems 1 according to the embodiments are examples and other various system configuration examples can be implemented according to various uses and/or purposes.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as general purpose computers, personal digital assistants, mobile telephones (such as WAP or 3G-compliant phones) and/or the like. Since the present invention can be implemented as software, each and every aspect of the present invention thus encompasses computer software implementable on a programmable device(s). The computer software can be provided to the programmable device(s) using any storage medium for storing processor readable code such as a floppy disk, hard disk, CD-ROM, magnetic tape device or solid state memory device.

Each hardware platform may include any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device(s), an output device(s), and/or a network device(s), depending on the type of each apparatus. Alternatively, the HDD may be provided outside of the apparatus as long as the HDD is accessible. In this example, a memory of the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-171240, filed Aug. 21, 2013 and Japanese Priority Application No. 2014-143942, filed Jul. 14, 2014, the entire contents of which are hereby incorporated herein by reference.

What is claimed is:

1. An information processing system including one or more terminal apparatuses and an information processing apparatus which are connected via a network, the information processing system comprising:

at least one memory having computer readable instructions stored thereon; and at least one processor configured to execute the computer readable instructions to, store content information in an information storage part;

determine an information transmission method for each of the one or more terminal apparatuses based on client information concerning the information transmission method, the client information being exchanged between the one or more terminal apparatuses and the information processing apparatus, the client information including at least (i) a unit of dividing the stored content information and (ii) cache information;

divide and convert the stored content information, based on the information transmission method determined for each of the one or more terminal apparatuses according to the client information, into at least first transmission information and second transmission information to be transmitted to the one or more terminal apparatuses;

transmit the first transmission information including a first display part of the stored content information to be displayed first to one of the one or more terminal apparatuses, and transmit the second transmission information including a second display part of the stored content information to be displayed after the first display part to the one of the one or more terminal apparatuses after transmitting the first transmission information, the second display part being different from the first display part;

display ones of the at least first transmission information and second transmission information via one or more display devices;

store sets of identification information identifying ones of the at least first transmission information and second transmission information which are being displayed at the one or more terminal apparatuses, respectively, in a display identification information storage part;

determine candidates for ones of the at least first transmission information and second transmission information to be transmitted to the one or more terminal apparatuses based on requests transmitted from the one or more terminal apparatuses to acquire ones of the at least first transmission information and second transmission information and the sets of identification information stored in the display identification information storage part; and control the information processing apparatus to transmit ones of the at least first transmission information and second transmission information, the ones of the at least first transmission information and second transmission information being candidates for being subsequently displayed by the one or more display devices; and cause ones of the at least first transmission information and second transmission information transmitted by the information processing apparatus to be stored in one or more transmission information storage parts at the one or more terminal apparatuses, wherein the one or more display devices are configured to display ones of the at least first transmission information and second transmission information stored in the one or more transmission information storage parts when the ones of the at least first transmission information and second transmission information are to be subsequently displayed and are stored in the one or more transmission information storage parts.

2. The information processing system as claimed in claim 1, wherein the first display part is displayed first at the one of the one or more terminal apparatuses and the second display part is displayed at the one of the one or more terminal apparatuses after the first display part is displayed.

3. The information processing system as claimed in claim 1, wherein,
the at least one processor is configured to execute the computer readable instructions to determine the unit of dividing the stored content information based on the cache information,
the cache information includes at least one of (i) a number of cacheable transmission information and (ii) an indication of an algorithm for determining transmission information to be cached, and
the cache information depends on capabilities of each of the one or more terminal apparatuses, wherein at least some of the one or more terminal apparatuses have differing capabilities.

4. The information processing system as claimed in claim 3, wherein,
the client information further includes (iii) a data format of the at least first transmission information and second transmission information and (iv) a display size of each of the at least first transmission information and second transmission information, and
the at least one processor is configured to execute the computer readable instructions to determine the data format and the display size based on the cache information that depends on capabilities of each of the one or more terminal apparatuses, wherein at least some of the one or more terminal apparatuses have differing capabilities.

5. The information processing system as claimed in claim 1, wherein,
the sets of identification information include page information of ones of the at least first transmission information and second transmission information, and
the at least one processor is configured to execute the computer readable instructions to control storage of ones of the at least first transmission information and second transmission information so that ones of the at least first transmission information and second transmission information nearest to the page information are to be transmitted based on relationships between the requests to acquire ones of the at least first transmission information and second transmission information and the page information of ones of the at least first transmission information and second transmission information included in the sets of identification information.

6. The information processing system as claimed in claim 1, wherein the at least one processor is further configured to execute the computer readable instructions to,
store candidates for ones of the at least first transmission information and second transmission information to be transmitted to the one or more terminal apparatuses in a look-ahead transmission information storage part at the information processing apparatus;
determine the candidates based on the cache information such that the look-ahead transmission information storage part will store the candidates for the ones of the at least first transmission information and second transmission information to be subsequently transmitted to the one or more terminal apparatuses; and
transmit ones of the at least first transmission information and second transmission information stored in the look-ahead transmission information storage part to the one or more terminal apparatuses when the ones of the at least first transmission information and second transmission information to be transmitted to the one or more terminal apparatuses are stored in the look-ahead transmission information storage part.

7. An information processing apparatus connected with one or more terminal apparatuses via a network, the information processing apparatus comprising:
at least one memory having computer readable instructions stored thereon; and
at least one processor configured to execute the computer readable instructions to,
store content information in an information storage part;
determine an information transmission method for each of the one or more terminal apparatuses based on client information concerning the information transmission method, the client information being exchanged between the one or more terminal apparatuses and the information processing apparatus, the client information including at least (i) a unit of dividing the stored content information and (ii) cache information;
divide and convert the stored content information, based on the information transmission method determined for each of the one or more terminal apparatuses according to the client information, into at least first transmission information and second transmission information to be transmitted to the one or more terminal apparatuses; and
transmit the first transmission information including a first display part of the stored content information to be displayed first to one of the one or more terminal apparatuses, and transmit the second transmission information including a second display part of the stored content information to be displayed after the first display part to the one of the one or more terminal apparatuses after transmitting the first transmission information, the second display part being different from the first display part,
wherein ones of the at least first transmission information and second transmission information are displayed at the one or more terminal apparatuses via one or more display devices;
store sets of identification information identifying ones of the at least first transmission information and second transmission information which are being displayed at the one or more terminal apparatuses, respectively, in a display identification information storage part;
determine candidates for ones of the at least first transmission information and second transmission information to be transmitted to the one or more terminal apparatuses based on requests received from the one or more terminal apparatuses to acquire ones of the at least first transmission information and second transmission information and the sets of identification information stored in the display identification information storage part;
transmit ones of the at least first transmission information and second transmission information, the ones of the at least first transmission information and second transmission information being candidates for being subsequently displayed by the one or more display devices; and cause ones of the at least first transmission information and second transmission information transmitted by the information processing apparatus to be stored in one or more transmission information storage parts at the one or more terminal apparatuses, wherein the one or more display devices are configured to display ones of the at least first transmission information and second transmission information stored in the one or more transmission information storage parts when the ones of the at least first transmission information and second transmission information are to be subsequently displayed and are stored in the one or more transmission information storage parts.

8. A terminal apparatus connected with an information processing apparatus via a network, the terminal apparatus comprising:

at least one memory having computer readable instructions stored thereon; and at least one processor configured to execute the computer readable instructions to, determine an information transmission method for the terminal apparatus based on client information concerning the information transmission method, the client information being exchanged between the terminal apparatus and the information processing apparatus, the client information including at least (i) a unit of dividing stored content information and (ii) cache information;

receive, from the information processing apparatus, at least first transmission information acquired from the stored content information being divided and converted by the information processing apparatus, based on the information transmission method determined for the terminal apparatus according to the client information, to include a first display part of the stored content information to be displayed first, and second transmission information acquired from the stored content information being divided and converted by the information processing apparatus, based on the information transmission method determined for the terminal apparatus according to the client information, to include a second display part of the stored content information to be displayed after the first display part after the first transmission information is received, the second display part being different from the first display part;

display the first transmission information and the second transmission information via a display device;

store sets of identification information identifying ones of the at least first transmission information and second transmission information which are being displayed at the terminal apparatus in a display identification information storage part;

determine candidates for ones of the at least first transmission information and second transmission information to be acquired from the information processing apparatus based on the sets of identification information stored in the display identification information storage part;

transmit a request to acquire ones of the at least first transmission information and second transmission information from the information processing apparatus;

receive ones of the at least first transmission information and second transmission information from the information processing apparatus, the ones of the at least first transmission information and second transmission information being candidates for being subsequently displayed by the display device;

store ones of the at least first transmission information and second transmission information received from the information processing apparatus in a transmission information storage part; and display ones of the at least first transmission information and second transmission information stored in the transmission information storage part via the display device when the ones of the at least first transmission information and second transmission information are to be subsequently displayed and are stored in the transmission information storage part.

9. An information transmission method carried out in an information processing system that includes one or more terminal apparatuses and an information processing apparatus connected via a network, the information transmission method comprising:

storing content information in an information storage part;

determining an information transmission method for each of the one or more terminal apparatuses based on client information concerning the information transmission method, the client information being exchanged between the one or more terminal apparatuses and the information processing apparatus, the client information including at least (i) a unit of dividing the stored content information and (ii) cache information;

dividing and converting the stored content information, based on the information transmission method determined for each of the one or more terminal apparatuses according to the client information, into at least first transmission information and second transmission information to be transmitted to the one or more terminal apparatuses;

transmitting the first transmission information including a first display part of the stored content information to be displayed first to one of the one or more terminal apparatuses, and transmitting the second transmission information including a second display part of the stored content information to be displayed after the first display part to the one of the one or more terminal apparatuses after transmitting the first transmission information, the second display part being different from the first display part;

displaying ones of the at least first transmission information and second transmission information via one or more display devices;

storing sets of identification information identifying ones of the at least first transmission information and second transmission information which are being displayed at the one or more terminal apparatuses, respectively, in a display identification information storage part;

determining candidates for ones of the at least first transmission information and second transmission information to be transmitted to the one or more terminal apparatuses based on requests transmitted from the one or more terminal apparatuses to acquire ones of the at least first transmission information and second transmission information and the sets of identification information stored in the display identification information storage part;

controlling the information processing apparatus to transmit ones of the at least first transmission information and second transmission information, the ones of the at least first transmission information and second transmission information being candidates for being subsequently displayed by the one or more display devices; and causing ones of the at least first transmission information and second transmission information transmitted by the information processing apparatus to be stored in one or more transmission information storage parts at the one or more terminal apparatuses, wherein the one or more display devices are configured to display ones of the at least first transmission information and second transmission information stored in the one or more transmission information storage parts when the ones of the at least first transmission information and second transmission information are to be subsequently displayed and are stored in the one or more transmission information storage parts.

\* \* \* \* \*